(12) United States Patent
Matsubara et al.

(10) Patent No.: US 7,959,535 B2
(45) Date of Patent: Jun. 14, 2011

(54) CONTROL FOR VEHICLE POWER TRANSMISSION SYSTEM

(75) Inventors: Tooru Matsubara, Toyota (JP); Atsushi Tabata, Okazaki (JP); Masakazu Kaifuku, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 245 days.

(21) Appl. No.: 12/457,158

(22) Filed: Jun. 2, 2009

(65) Prior Publication Data

US 2009/0305832 A1 Dec. 10, 2009

(30) Foreign Application Priority Data

Jun. 10, 2008 (JP) .................................. 2008-151406

(51) Int. Cl.
*B60K 1/02* (2006.01)
(52) U.S. Cl. ......................................... 477/3; 180/65.28
(58) Field of Classification Search ... 477/3; 180/65.28, 180/65.7
See application file for complete search history.

(56) References Cited

U.S. PATENT DOCUMENTS

2006/0003863 A1* 1/2006 Tabata et al. ...................... 477/2

FOREIGN PATENT DOCUMENTS

| JP | A-1-167440 | 7/1989 |
|----|------------|--------|
| JP | A-4-365643 | 12/1992 |
| JP | A-11-159380 | 6/1999 |
| JP | A-2004-132285 | 4/2004 |
| JP | A-2006-335127 | 12/2006 |
| JP | A-2008-120352 | 5/2008 |

OTHER PUBLICATIONS

Mar. 16, 2010 Notification of Reason for Refusal issued in Japanese Application No. 2008-151406 (with translation).

* cited by examiner

*Primary Examiner* — Roger L Pang
*Assistant Examiner* — Derek D Knight
(74) *Attorney, Agent, or Firm* — Oliff & Berridge, PLC

(57) ABSTRACT

A controller for a vehicle power transmission system includes: an electric differential unit that includes a differential mechanism, having an input shaft and an output shaft, and an electric motor and that allows controlling a differential state between the rotational speed of the input shaft coupled to an engine and the rotational speed of the output shaft by controlling an operating state of the electric motor coupled to a rotating element of the differential mechanism; a transmission unit that is arranged in a power transmission path between the electric differential unit and a drive wheel; and an engine upper limit setting device that, when the transmission unit is shifting speeds, prelimits an upper limit of the rotational speed of the engine when the rotational speed of the engine increases because of torque reduction control by the electric motor. With the above control, the rotational speed of the engine is prevented from reaching a high rotational speed region.

15 Claims, 11 Drawing Sheets

FIG. 2

|  | C1 | C2 | B1 | B2 | B3 | GEAR RATIO | STEP |
|---|---|---|---|---|---|---|---|
| 1st | ◯ |  |  |  | ◯ | 3.357 | 1.54 |
| 2nd | ◯ |  |  | ◯ |  | 2.180 | 1.53 |
| 3rd | ◯ |  | ◯ |  |  | 1.424 | 1.42 |
| 4th | ◯ | ◯ |  |  |  | 1.000 | TOTAL 3.36 |
| R |  | ◯ |  |  | ◯ | 3.209 | |
| N |  |  |  |  |  |  | |

◯ ENGAGED

<SHIFT LINE MAP>

<ENGINE FUEL CONSUMPTION MAP>

FIG. 10

<EXAMPLE OF UPPER LIMIT OF ENGINE ROTATIONAL SPEED DURING SHIFTING>

|  |  | BATTERY LIMIT | | |
|---|---|---|---|---|
|  |  | 3kw | 10kw | 30kw |
| SHIFT PATTERN | 1-2 | 3500rpm | 4200rpm | 4700rpm |
| | 2-3 | 3000rpm | 3700rpm | 4700rpm |
| | 3-4 | 3000rpm | 3700rpm | 4700rpm |
| | 2-1 | 3000rpm | 3700rpm | 4700rpm |
| | 3-2 | 3000rpm | 3700rpm | 4200rpm |
| | 4-3 | 2800rpm | 3500rpm | 4200rpm |
| | 3-1 | 2800rpm | 3500rpm | 4200rpm |
| | 4-2 | 2800rpm | 3500rpm | 4000rpm |

CONTROL FOR VEHICLE POWER TRANSMISSION SYSTEM

INCORPORATION BY REFERENCE

The disclosure of Japanese Patent Application No. 2008-151406 filed on Jun. 10, 2008 including the specification, drawings and abstract is incorporated herein by reference in its entirety.

BACKGROUND OF THE INVENTION

1. Field of the Invention

The invention relates to a controller for a vehicle power transmission system that includes an electric differential unit which includes a differential mechanism, having an input shaft and an output shaft, and an electric motor and which allows controlling a differential state between the rotational speed of the input shaft coupled to an engine and the rotational speed of the output shaft by controlling an operating state of the electric motor coupled to a rotating element of the differential mechanism, and a transmission unit that is arranged in a power transmission path between the electric differential unit and a drive wheel, and the vehicle power transmission system transmits power of the engine to the drive wheel. More specifically, the invention relates to a technique for suppressing an increase in engine rotational speed when the transmission unit shifts speeds.

2. Description of the Related Art

There is a known vehicle power transmission system that includes an electric differential unit. The electric differential unit includes a differential mechanism, having an input shaft and an output shaft, and an electric motor. The electric differential unit allows controlling a differential state between the rotational speed of the input shaft coupled to an engine and the rotational speed of the output shaft by controlling an operating state of the electric motor coupled to a rotating element of the differential mechanism. In the above vehicle power transmission system, the differential mechanism is, for example, formed of a planetary gear set. Then, a major portion of the power from the engine is mechanically transmitted to a drive wheel by the differential action of the differential mechanism, and the remaining portion of the power from the engine is electrically transmitted from a first electric motor to a second electric motor through an electrical path. Thus, the differential state is electrically controlled, that is, the speed ratio of the electric differential unit is appropriately varied. In this manner, the vehicle power transmission system is controlled to drive the vehicle while maintaining the engine at an optimally rotational state. This can improve fuel economy. Japanese Patent Application Publication No. 2006-335127 (JP-A-2006-335127) describes an example of the above vehicle power transmission system. JP-A-2006-335127 describes a technique for suppressing a shift shock by means of a torque reduction and an increase in engine rotational speed using an electric motor (or an engine) when the transmission unit shifts speeds.

Incidentally, in the vehicle power transmission system described in JP-A-2006-335127, torque reduction control is carried out using an electric motor (or an engine) when the transmission unit shifts speeds. However, for example, when the level of charge of an electrical storage device reaches an excessive state of charge in a state where it is impossible to reduce torque by the engine because of a decrease in engine coolant temperature, or the like, a torque reduction amount by the electric motor is limited. This may cause a situation where a shift shock is not sufficiently removed. For this reason, the engine rotational speed is increased to use the inertia of the engine, thus ensuring a torque reduction amount. However, when a torque reduction amount by the electric motor is limited as described above, an amount of increase in engine rotational speed increases. Therefore, there is a possibility that the engine rotational speed may reach a high rotational speed region (overrevolution). In addition, as the engine rotational speed reaches the high rotational speed region, an electronic throttle valve is closed to limit an engine torque in order to reduce the engine rotational speed, and the engine torque limitation may possibly cause a shift shock. However, there has been taken no effective measures against the above problem.

SUMMARY OF THE INVENTION

The invention provides a controller for a vehicle power transmission system that includes an electric differential unit which includes a differential mechanism, having an input shaft and an output shaft, and an electric motor and which allows controlling a differential state between the rotational speed of the input shaft coupled to an engine and the rotational speed of the output shaft by controlling an operating state of the electric motor coupled to a rotating element of the differential mechanism, a transmission unit that is arranged in a power transmission path between the electric differential unit and a drive wheel, and an engine upper limit setting device that is able to prevent an engine torque limitation and a shift shock by preventing the engine rotational speed from reaching a high rotational speed region when the transmission unit is shifting speeds, and that transmits power of the engine to the drive wheel.

An aspect of the invention provides a controller for a vehicle power transmission system. The vehicle power transmission system that transmits power of an engine to a drive wheel includes: an electric differential unit that includes a differential mechanism, having an input shaft and an output shaft, and an electric motor and that allows controlling a differential state between the rotational speed of the input shaft coupled to the engine and the rotational speed of the output shaft by controlling an operating state of the electric motor coupled to a rotating element of the differential mechanism; a transmission unit that is arranged in a power transmission path between the electric differential unit and the drive wheel; and an engine upper limit setting device that, when the transmission unit is shifting speeds, prelimits an upper limit of the rotational speed of the engine when the rotational speed of the engine increases because of torque reduction control by the electric motor.

With the above configuration, the above vehicle power transmission system includes the engine upper limit setting device that, when the transmission unit is shifting speeds, prelimits an upper limit of the rotational speed of the engine when the rotational speed of the engine increases because of torque reduction control by the electric motor. Thus, an increase in engine rotational speed is suppressed, and the engine rotational speed is prevented from reaching a high rotational speed region. In addition, in accordance with this, an engine torque limitation by, for example, closing an electronic throttle valve is prevented. Thus, it is possible to prevent a shift shock associated with the engine torque limitation.

In the vehicle power transmission system, the engine upper limit setting device may switch the upper limit of the rotational speed of the engine when a torque limitation of the engine is prohibited.

With the above vehicle power transmission system, the engine upper limit setting device switches the upper limit of the rotational speed of the engine when a torque limitation of the engine is prohibited. Thus, when an engine torque limitation is prohibited, that is, when the engine rotational speed tends to reach a high rotational speed region, the upper limit of the engine rotational speed is switched to a desired value. Thus, even when the engine rotational speed increases with the progress of shift of the transmission unit, the engine rotational speed is effectively prevented from reaching the high rotational speed region.

In the vehicle power transmission system, a determination as to whether the engine upper limit setting device switches the upper limit of the rotational speed of the engine may be made on the basis of the rotational speed of the engine at the time when the transmission unit starts shifting speeds.

With the above vehicle power transmission system, a determination as to whether the engine upper limit setting device switches the upper limit of the rotational speed of the engine is made on the basis of the rotational speed of the engine at the time when the transmission unit starts shifting speeds. Thus, the upper limit of the rotational speed of the engine is switched appropriately. For example, when the engine rotational speed at the time when the transmission unit starts shifting speeds falls within a high rotational speed region, the upper limit of the engine rotational speed is switched to a desired value. Thus, even when the engine rotational speed increases with the progress of shift of the transmission unit, the engine rotational speed is effectively prevented from reaching the high rotational speed region. On the other hand, when the engine rotational speed at the time when the transmission unit starts shifting speeds falls within a low rotational speed region, the engine rotational speed does not reach the high rotational speed region even when the upper limit is not switched, so the above control will not be carried out. Thus, a load on control due to the above control is reduced.

In the vehicle power transmission system, a determination as to whether the engine upper limit setting device switches the upper limit of the rotational speed of the engine may be made on the basis of a torque reduction amount required at the time when the transmission unit shifts speeds.

With the above vehicle power transmission system, a determination as to whether the engine upper limit setting device switches the upper limit of the rotational speed of the engine is made on the basis of a torque reduction amount required at the time when the transmission unit shifts speeds. Thus, the upper limit of the rotational speed of the engine is switched appropriately. For example, when the required torque reduction amount is by far larger than a torque reduction amount that can be ensured by the electric motor, the upper limit of the engine rotational speed is switched to a desired value. Thus, even when the engine rotational speed increases with the progress of shift of the transmission unit, the engine rotational speed is effectively prevented from reaching a high rotational speed region. On the other hand, when the required torque reduction amount can be sufficiently ensured by the electric motor, the engine rotational speed does not reach the high rotational speed region even when the upper limit of the engine rotational speed is not switched, so the above control will not be carried out. Thus, it is possible to prevent a decrease in driving force by unnecessarily suppressing engine rotation.

In the vehicle power transmission system, a determination as to whether the engine upper limit setting device switches the upper limit of the rotational speed of the engine may be made on the basis of an input torque from the engine.

With the above vehicle power transmission system, a determination as to whether the engine upper limit setting device switches the upper limit of the rotational speed of the engine is made on the basis of an input torque from the engine. Thus, the upper limit of the rotational speed of the engine is switched appropriately. For example, when the input torque from the engine is large, the engine rotational speed tends to reach a high rotational speed region as the transmission unit shifts speeds. Thus, the upper limit of the engine rotational speed is switched to a desired value. By so doing, even when the engine rotational speed increases with the progress of shift of the transmission unit, the engine rotational speed is effectively prevented from reaching the high rotational speed region. On the other hand, when the input torque is small, the engine rotational speed does not reach the high rotational speed region even when the upper limit of the engine rotational speed is not switched, so the above control will not be carried out. Thus, it is possible to prevent a decrease in driving force by unnecessarily suppressing engine rotation.

In the vehicle power transmission system, a determination as to whether the engine upper limit setting device switches the upper limit of the rotational speed of the engine may be made on the basis of a vehicle speed.

With the above vehicle power transmission system, a determination as to whether the engine upper limit setting device switches the upper limit of the rotational speed of the engine is made on the basis of a vehicle speed. Thus, the upper limit of the rotational speed of the engine is switched appropriately. For example, when the vehicle speed falls within a high vehicle speed region, a torque reduction amount is large, so the engine rotational speed tends to reach a high rotational speed region. Then, by switching the upper limit of the engine rotational speed to a desired value, it is possible to effectively prevent the engine rotational speed from reaching the high rotational speed region. On the other hand, when the vehicle speed falls within a low vehicle speed region, a torque reduction amount is small. Thus, the engine rotational speed does not reach the high rotational speed region even when the upper limit of the engine rotational speed is not switched, so the above control will not be carried out. Thus, a load on control due to the above control is reduced.

In the vehicle power transmission system, a determination as to whether the engine upper limit setting device switches the upper limit of the rotational speed of the engine may be made on the basis of a charge/discharge limit of an electrical storage device.

With the above vehicle power transmission system, a determination as to whether the engine upper limit setting device switches the upper limit of the rotational speed of the engine is made on the basis of a charge/discharge limit of an electrical storage device. Thus, the upper limit of the rotational speed of the engine is switched appropriately. For example, when the state of charge of the electrical storage device exceeds a charge limit, power generation by the electric motor is limited. This limits a torque reduction amount that can be ensured (removed) by the electric motor. Thus, the engine rotational speed is increased and tends to reach a high rotational speed region. However, by switching the upper limit of the engine rotational speed to a desired value in advance, it is possible to effectively prevent the engine rotational speed from reaching the high rotational speed region. On the other hand, when power generation by the electric motor is not limited, and it is possible to sufficiently ensure (remove) a torque reduction amount by the electric motor, the engine rotational speed does not reach the high rotational speed region even when the upper limit of the engine rotational speed is not switched, so the above control will not be carried out. Thus, it is possible to prevent a decrease in driving force by unnecessarily suppressing engine rotation.

In the vehicle power transmission system, a determination as to whether the engine upper limit setting device switches the upper limit of the rotational speed of the engine may be made on the basis of an accelerator operation amount.

With the above vehicle power transmission system, a determination as to whether the engine upper limit setting device switches the upper limit of the rotational speed of the engine is made on the basis of an accelerator operation amount. Thus, the upper limit of the rotational speed of the engine is switched appropriately. For example, when the accelerator operation amount is large, the engine rotational speed tends to reach a high rotational speed region as the transmission unit shifts speeds. Then, by switching the upper limit of the engine rotational speed, it is possible to effectively prevent the engine rotational speed from reaching the high rotational speed region. On the other hand, when the accelerator operation amount is small, the engine rotational speed does not reach the high rotational speed region even when the upper limit of the engine rotational speed is not switched, so the above control will not be carried out. Thus, it is possible to prevent a decrease in driving force by unnecessarily suppressing engine rotation.

In the vehicle power transmission system, a determination as to whether the engine upper limit setting device switches the upper limit of the rotational speed of the engine may be made on the basis of a shift pattern of the transmission unit.

With the above vehicle power transmission system, a determination as to whether the engine upper limit setting device switches the upper limit of the rotational speed of the engine is made on the basis of a shift pattern of the transmission unit. Thus, the upper limit of the rotational speed of the engine is switched appropriately. For example, in the case of a shift having a large variation in rotational speed when the transmission unit shifts speeds, the engine rotational speed tends to reach a high rotational speed region as the transmission unit shifts speeds. In the above case, by switching the upper limit of the engine rotational speed to a desired value, it is possible to effectively prevent the engine rotational speed from reaching the high rotational speed region. On the other hand, in the case of a shift that does not increase the engine rotational speed to the high rotational speed region, the above control will not be carried out. Thus, it is possible to prevent a decrease in driving force by unnecessarily suppressing engine rotation.

In the vehicle power transmission system, the upper limit of the rotational speed of the engine may be switched on the basis of a torque reduction amount required at the time when the transmission unit shifts speeds.

With the above vehicle power transmission system, the upper limit of the rotational speed of the engine is switched on the basis of a torque reduction amount required at the time when the transmission unit shifts speeds. Thus, the upper limit of the engine rotational speed is switched to a desired value on the basis of the torque reduction amount, and it is possible to effectively prevent the engine rotational speed from reaching a high rotational speed region. For example, the upper limit of the engine rotational speed is decreased as the torque reduction amount increases, so it is possible to effectively prevent the engine rotational speed from reaching the high rotational speed region.

In the vehicle power transmission system, the upper limit of the rotational speed of the engine may be switched on the basis of an input torque from the engine.

With the above vehicle power transmission system, the upper limit of the rotational speed of the engine is switched on the basis of an input torque from the engine. Thus, the upper limit of the engine rotational speed is switched to a desired value on the basis of the input torque, and it is possible to effectively prevent the engine rotational speed from reaching a high rotational speed region. For example, the upper limit of the engine rotational speed is decreased as the input torque increases, so it is possible to effectively prevent the engine rotational speed from reaching the high rotational speed region.

In the vehicle power transmission system, the upper limit of the rotational speed of the engine may be switched on the basis of a vehicle speed.

With the above vehicle power transmission system, the upper limit of the rotational speed of the engine is switched on the basis of a vehicle speed. Thus, the upper limit of the engine rotational speed is switched to a desired value on the basis of the vehicle speed, and it is possible to effectively prevent the engine rotational speed from reaching a high rotational speed region. For example, the upper limit of the engine rotational speed is switched to a lower value as the vehicle speed increases. Thus, it is possible to effectively prevent the engine rotational speed from reaching the high rotational speed region.

In the vehicle power transmission system, the upper limit of the rotational speed of the engine may be switched on the basis of a charge/discharge limit of an electrical storage device.

With the above vehicle power transmission system, the upper limit of the rotational speed of the engine is switched on the basis of a charge/discharge limit of an electrical storage device. Thus, the upper limit of the engine rotational speed is switched to a desired value on the basis of the charge/discharge limit of the electrical storage device, and it is possible to effectively prevent the engine rotational speed from reaching a high rotational speed region.

In the vehicle power transmission system, the upper limit of the rotational speed of the engine may be switched on the basis of an accelerator operation amount.

With the above vehicle power transmission system, the upper limit of the rotational speed of the engine is switched on the basis of an accelerator operation amount. Thus, the upper limit of the engine rotational speed is switched to a desired value on the basis of the accelerator operation amount, and it is possible to effectively prevent the engine rotational speed from reaching a high rotational speed region. For example, the upper limit of the engine rotational speed is decreased as the accelerator operation amount increases, so it is possible to effectively prevent the engine rotational speed from reaching the high rotational speed region.

In the vehicle power transmission system, the upper limit of the rotational speed of the engine may be switched on the basis of a shift pattern of the transmission unit.

With the above vehicle power transmission system, the upper limit of the rotational speed of the engine is switched on the basis of a shift pattern of the transmission unit. Thus, the upper limit of the engine rotational speed is switched to a desired value on the basis of the shift pattern of the transmission unit, and it is possible to effectively prevent the engine rotational speed from reaching a high rotational speed region. For example, for a shift of the transmission unit, which tends to cause the engine rotational speed to reach the high rotational speed region, the upper limit of the engine rotational speed is decreased. Thus, it is possible to effectively prevent the engine rotational speed from reaching the high rotational speed region.

In the vehicle power transmission system, the upper limit of the rotational speed of the engine may be switched on the basis of an overrevolution determination rotational speed of the engine.

With the above vehicle power transmission system, the upper limit of the rotational speed of the engine is switched on the basis of an overrevolution determination rotational speed of the engine. Thus, the upper limit of the engine rotational speed is switched to a desired value on the basis of the overrevolution determination rotational speed, and it is possible to effectively prevent the engine rotational speed from reaching the high rotational speed region.

The transmission unit may automatically shift speeds. By so doing, the transmission unit automatically shifts into a desired speed ratio on the basis of a state of the vehicle, and it is possible to obtain a desired driving force.

The electric differential unit may be an electric continuously variable transmission unit that is formed of a differential gear and two electric motors. By so doing, by controlling the two electric motors, it is possible to control the rotational speed of a predetermined rotating element that constitutes the differential gear, so it is possible to steplessly and freely change the speed ratio of the electric differential unit.

The transmission unit may be a stepped transmission unit, so the transmission unit may shift speed ratios in a stepped manner.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is an operation table that illustrates combinations of operated hydraulic frictional engagement elements used in shift operation of the power transmission system shown in FIG. 1;

FIG. 10 is an example of an upper limit of an engine rotational speed during shifting, the upper limit being set by a controller according to the embodiment;

DETAILED DESCRIPTION OF EMBODIMENTS

Hereinafter, an embodiment of the invention will be described in detail with reference to the accompanying drawings. Note that in the following embodiment, drawings are simplified or deformed where appropriate, and the scale ratio, shape, and the like, of each component is not always drawn accurately.

Figure 1:
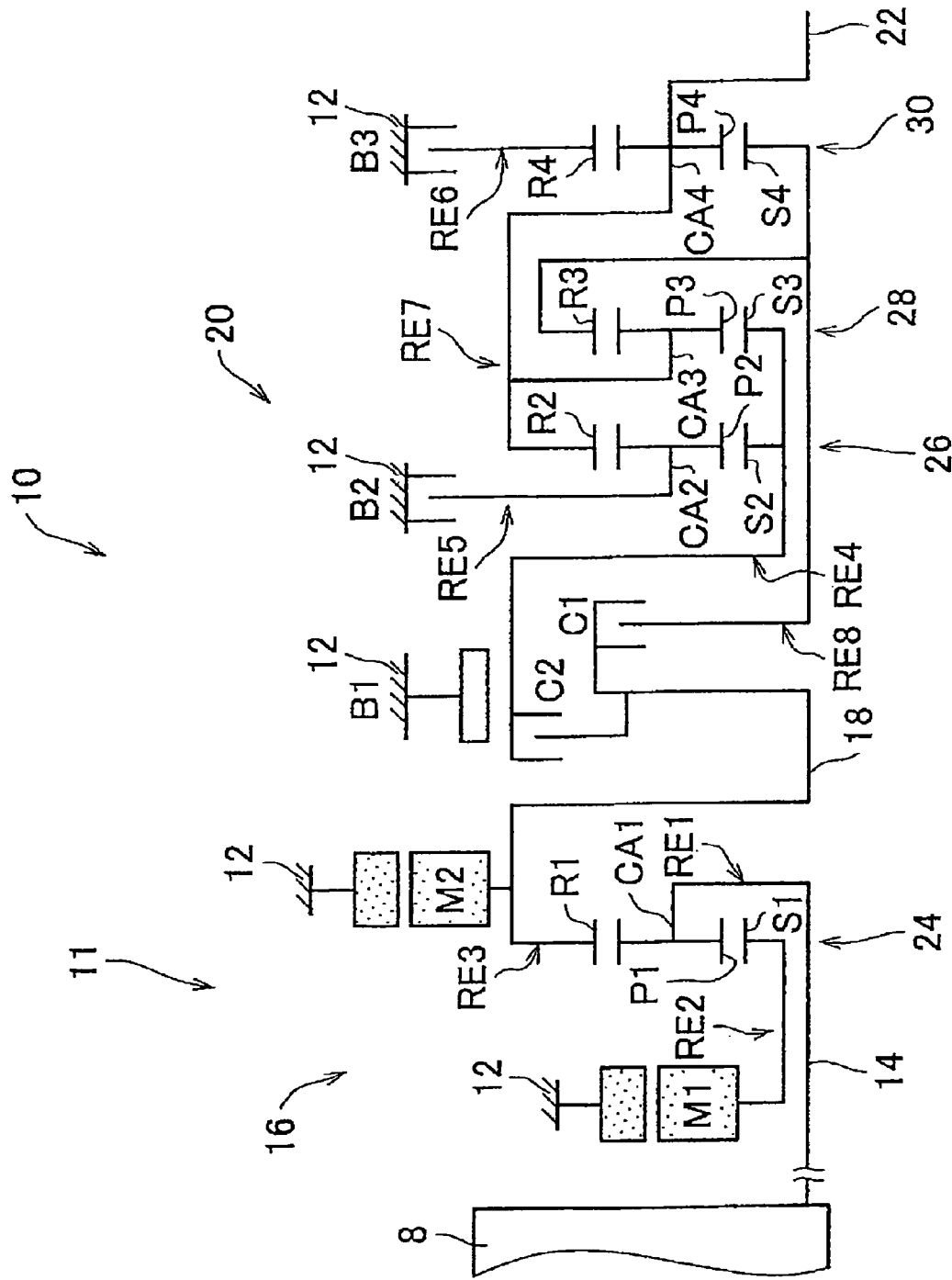
FIG. 1 is a skeleton diagram that illustrates the configuration of a power transmission system for a hybrid vehicle according to an example embodiment of the invention.

FIG. 1 is a skeleton diagram that illustrates a transmission mechanism 10 that constitutes part of a power transmission system for a hybrid vehicle according to the embodiment of the invention. As shown in FIG. 1, the transmission mechanism 10 includes an input shaft 14, a differential unit 11, an automatic transmission unit 20, and an output shaft 22, which are coaxially arranged in series with one another in a transmission case 12 (hereinafter, referred to as the case 12). The case 12 serves as a non-rotating member and is secured to the body of the vehicle. The input shaft 14 serves as an input rotating member. The differential unit 11 serves as a continuously variable transmission unit, and is directly coupled to the input shaft 14 or indirectly coupled to the input shaft 14 via a pulsation absorbing damper (vibration damper) (not shown), or the like. The automatic transmission unit 20 serves as a power transmission unit, and is coupled in series in a power transmission path between the differential unit 11 and drive wheels 34 (see FIG. 7) via a power transmission member (power transmission shaft) 18. The output shaft 22 serves as an output rotating member, and is coupled to the automatic transmission unit 20. The transmission mechanism 10 is, for example, suitably used in a front-engine rear-drive (FR) vehicle in which the transmission mechanism 10 is longitudinally mounted with respect to the vehicle. The transmission mechanism 10 is provided between the pair of drive wheels 34 and an engine 8, which is an internal combustion engine, such as a gasoline engine and a diesel engine, as a driving source for propelling the vehicle. The engine 8 is directly coupled to the input shaft 14 or indirectly coupled to the input shaft 14 via a pulsation absorbing damper (not shown). The transmission mechanism 10 transmits power from the engine 8 to the pair of drive wheels 34 sequentially through a differential gear unit (final reduction gear) 32 (see FIG. 7), which constitutes part of the power transmission path, a pair of axles, and the like. Note that the transmission mechanism 10 according to the present embodiment corresponds to a vehicle power transmission system, the differential unit 11 corresponds to an electric differential unit, and the automatic transmission unit 20 corresponds to a transmission unit.

In this way, in the transmission mechanism 10 according to the present embodiment, the engine 8 is directly coupled to the differential unit 11. The "direct coupling" means that the engine 8 is coupled to the differential unit 11 without intervening a hydraulic transmission device, such as a torque converter and a fluid coupling, and, for example, the above coupling via the pulsation absorbing damper, or the like, is included in the direct coupling. Note that the transmission mechanism 10 is formed symmetrically with respect to the axis thereof, so the lower half below the axis is omitted in the skeleton diagram of FIG. 1. This also applies to the following embodiments.

The differential unit 11 includes, a first electric motor M1, a power distribution mechanism 16, and a second electric motor M2. The power distribution mechanism 16 is a mechanical mechanism that mechanically distributes the output of the engine 8 input to the input shaft 14 and serves as a differential mechanism that distributes the output of the engine 8 to the first electric motor M1 and the power transmission member 18. The second electric motor M2 is operatively coupled to the power transmission member 18 so as to rotate integrally with the power transmission member 18. The first electric motor M1 and the second electric motor M2 according to the present embodiment are so called motor generators that also have a power generating function. The first electric motor M1 at least has a generator (power generating) function for generating reaction force. The second electric motor M2 at least has a motor (electric motor) function for outputting driving force as a driving source for propelling the vehicle. Note that the first electric motor M1 and the second electric motor M2 correspond to an electric motor according to the aspect of the invention.

The power distribution mechanism 16, which functions as a differential mechanism, is mainly formed of a single pinion type first planetary gear set 24 having a predetermined gear ratio $\rho 1$ of, for example, about "0.418". The first planetary gear set 24 includes a first sun gear S1, first planetary gears P1, a first carrier CA1 and a first ring gear R1 as rotating elements (elements). The first carrier CA1 rotatably and revolvably supports the first planetary gears P1. The first ring gear R1 is in mesh with the first sun gear S1 via the first planetary gears P1. When the number of teeth of the first sun gear S1 is ZS1, and the number of teeth of the first ring gear R1 is ZR1, the above gear ratio $\rho 1$ is ZS1/ZR1.

In the power distribution mechanism 16, the first carrier CA1 is coupled to the input shaft 14, that is, the engine 8, and the first sun gear S1 is coupled to the first electric motor M1, and the first ring gear R1 is coupled to the power transmission member 18. The thus configured power distribution mechanism 16 is placed in a differential state in which three elements of the first planetary gear set 24, that is, the first sun gear S1, the first carrier CA1 and the first ring gear R1, are respectively rotatable with respect to one another and the differential action is operable, that is, the differential action works. Thus, the output of the engine 8 is distributed between the first electric motor M1 and the power transmission member 18, part of the distributed output of the engine 8 causes the first electric motor M1 to generate electric energy and then the generated electric energy is stored or used to drive the second electric motor M2 for rotation. Therefore, the differential unit 11 (power distribution mechanism 16) functions as an electric differential device, and, for example, the differential unit 11 is placed in a so-called continuously variable transmission state (electric CVT state). Hence, the rotation of the power transmission member 18 is continuously varied irrespective of a predetermined rotation of the engine 8. That is, the differential unit 11 functions as an electric continuously variable transmission of which the gear ratio $\gamma 0$ (rotational speed $N_{IN}$ of the input shaft 14/rotational speed $N_{18}$ of the power transmission member 18) is continuously varied from a minimum value $\gamma 0$ min to a maximum value $\gamma 0$ max. In this way, by controlling the operating states of the first electric motor M1, the second electric motor M2 and the engine 8 that are coupled to the power distribution mechanism 16 (differential unit 11) so as to allow power to be transmitted, the power distribution mechanism 16 is operated as a continuously variable transmission mechanism of which the differential state between the rotational speed of the input shaft 14 (which is an example of an input shaft of a differential mechanism) and the rotational speed of the power transmission member 18 (which is an example of the output shaft of the differential mechanism) that functions as the output shaft is controlled.

The automatic transmission unit 20, which serves as a transmission unit, is a stepped automatic transmission that constitutes part of the power transmission path from the differential unit 11 to the drive wheels 34. The automatic transmission unit 20 includes a single pinion type second planetary gear set 26, a single pinion type third planetary gear set 28 and a single pinion type fourth planetary gear set 30. The automatic transmission unit 20 is a planetary gear type multi-speed transmission that functions as a stepped automatic transmission. The second planetary gear set 26 includes a second sun gear S2, second planetary gears P2, a second carrier CA2 and a second ring gear R2. The second carrier CA2 rotatably and revolvably supports the second planetary gears P2. The second ring gear R2 is in mesh with the second sun gear S2 via the second planetary gears P2. The second planetary gear set 26 has a predetermined gear ratio $\rho 2$ of, for example, about "0.562". The third planetary gear set 28 includes a third sun gear S3, third planetary gears P3, a third carrier CA3 and a third ring gear R3. The third carrier CA3 rotatably and revolvably supports the third planetary gears P3. The third ring gear R3 is in mesh with the third sun gear S3 via the third planetary gears P3. The third planetary gear set 28 has a predetermined gear ratio $\rho 3$ of, for example, about "0.425". The fourth planetary gear set 30 includes a fourth sun gear S4, fourth planetary gears P4, a fourth carrier CA4 and a fourth ring gear R4. The fourth carrier CA4 rotatably and revolvably supports the fourth planetary gears P4. The fourth ring gear R4 is in mesh with the fourth sun gear S4 via the fourth planetary gears P4. The fourth planetary gear set 30 has a predetermined gear ratio $\rho 4$ of, for example, about "0.421". When the number of teeth of the second sun gear S2 is ZS2, the number of teeth of the second ring gear R2 is ZR2, the number of teeth of the third sun gear S3 is ZS3, the number of teeth of the third ring gear R3 is ZR3, the number of teeth of the fourth sun gear S4 is ZS4, and the number of teeth of the fourth ring gear R4 is ZR4, the gear ratio $\rho 2$ is ZS2/ZR2, the gear ratio $\rho 3$ is ZS3/ZR3, and the gear ratio $\rho 4$ is ZS4/ZR4.

In the automatic transmission unit 20, the second sun gear S2 and the third sun gear S3 are integrally coupled to each other and are selectively coupled to the power transmission member 18 via a second clutch C2 and selectively coupled to the case 12 via a first brake B1, the second carrier CA2 is selectively coupled to the case 12 via a second brake B2, the fourth ring gear R4 is selectively coupled to the case 12 via a third brake B3, the second ring gear R2, the third carrier CA3 and the fourth carrier CA4 are integrally coupled to one another and are coupled to the output shaft 22, the third ring gear R3 and the fourth sun gear S4 are integrally coupled to each other and are selectively coupled to the power transmission member 18 via a first clutch C1.

In this way, the automatic transmission unit 20 and the differential unit 11 (power transmission member 18) are selectively coupled via the first clutch C1 or the second clutch C2 used to establish the gear of the automatic transmission unit 20. In other words, in a power transmission path between the power transmission member 18 and the automatic transmission unit 20, that is, a power transmission path from the differential unit 11 (power transmission member 18) to the drive wheels 34, the first clutch C1 and the second clutch C2 function as engagement devices that selectively switch between a power transmission state where power transmission in the power transmission path is allowed and a power cutoff state where power transmission in the power transmission path is cut off. That is, at least one of the first clutch C1 and the second clutch C2 is engaged to have the power transmission path placed in the power transmission state, or both the first clutch C1 and the second clutch C2 are released to have the power transmission path placed in the power cutoff state.

In addition, the automatic transmission unit 20 provides a gear ratio γ (=rotational speed $N_{18}$ of the power transmission member 18/rotational speed $N_{OUT}$ of the output shaft 22) that changes in substantially geometric progression gear by gear in such a manner that a clutch-to-clutch shift is carried out to selectively establish each gear. In the clutch-to-clutch shift, a release-side engagement device is released, and an engage-side engagement device is engaged. For example, as shown in the engagement operation table of FIG. 2, the fist clutch C1 and the third brake. B3 are engaged to establish a first-speed gear of which the gear ratio γ1 is, for example, about "3.357" as a maximum value, the first clutch C1 and the second brake B2 are engaged to establish a second-speed gear of which the gear ratio γ2 is, for example, about "2.180." smaller than that of the first-speed gear, the first clutch C1 and the first brake B1 are engaged to establish a third-speed gear of which the gear ratio γ3 is, for example, about "1.424" smaller than that of the second-speed gear, and the first clutch C1 and the second clutch C2 are engaged to establish a fourth-speed gear of which the gear ratio γ4 is, for example, about "1.000" smaller than that of the third-speed gear. In addition, the second clutch C2 and the third brake B3 are engaged to establish a reverse gear of which the gear ratio γR is, for example, about "3.209" that is an intermediate value between the first-speed gear and the second-speed gear. In addition, the first clutch C1, the second clutch C2, the first brake B1, the second brake B2 and the third brake B3 are released to have the automatic transmission unit 20 placed in a neutral "N" state.

The first clutch C1, the second clutch C2, the first brake B1, the second brake B2 and the third brake B3 (hereinafter, referred to as clutches C and brakes B when it is not necessary to distinguish them from one another) are hydraulic frictional engagement devices as engagement elements that are often used in an existing vehicle automatic transmission. Each of the clutches C and brakes B is, for example, formed of a wet multiple-plate type in which mutually stacked multiple friction plates are pressed by a hydraulic actuator or a band brake in which one end of one or two bands wound around the outer peripheral surface of a rotating drum is tightened by a hydraulic actuator. Each of the clutches C and brakes B is used to selectively couple members on both sides thereof.

In the thus configured transmission mechanism 10, the differential unit 11, which functions as a continuously variable transmission, and the automatic transmission unit 20 constitute a continuously variable transmission as a whole. In addition, by controlling the gear ratio of the differential unit 11 at constant, the differential unit 11 and the automatic transmission unit 20 may be configured as a state equivalent to a stepped transmission.

Specifically, the differential unit 11 functions as a continuously variable transmission, and the automatic transmission unit 20 connected in series with the differential unit 11 functions as a stepped transmission. Thus, for at least one gear M of the automatic transmission unit 20, a rotational speed input to the automatic transmission unit 20 (hereinafter, input rotational speed of the automatic transmission unit 20), that is, the rotational speed of the power transmission member 18 (hereinafter, power transmission member rotational speed $N_{18}$), is steplessly varied. Therefore, a stepless gear ratio range may be obtained in that gear M. Thus, the total gear ratio γT (=rotational speed $N_{IN}$ of the input shaft 14/rotational speed $N_{OUT}$ of the output shaft 22) of the transmission mechanism 10 is steplessly obtained, and a continuously variable transmission is constructed in the transmission mechanism 10. The total gear ratio γT of the transmission mechanism 10 is a total gear ratio γT of the transmission mechanism 10 as a whole established on the basis of the gear ratio γ0 of the differential unit 11 and the gear ratio γ of the automatic transmission unit 20.

For example, for each of the first-speed gear to fourth-speed gear and reverse gear of the automatic transmission unit 20 as shown in the engagement operation chart in FIG. 2, the power transmission member rotational speed $N_{18}$ is steplessly varied, so a stepless gear ratio range may be obtained for each gear. Thus, each gear can be steplessly and continuously varied to obtain gear ratios between the adjacent gears, so the total gear ratio γT of the transmission mechanism 10 as a whole may be obtained steplessly.

In addition, the gear ratio of the differential unit 11 is controlled at constant, and the clutches C and the brakes B are selectively engaged to selectively establish any one of the first-speed gear to the fourth-speed gear or the reverse gear. Thus, the total gear ratio γT of the transmission mechanism 10, which changes in substantially geometric progression, may be obtained gear by gear. Thus, the transmission mechanism 10 may be configured as a state equivalent to a stepped transmission.

For example, when the gear ratio γ0 of the differential unit 11 is controlled so as to be fixed at "1", as shown in the engagement operation chart of FIG. 2, the total gear ratio γT of the transmission mechanism 10, corresponding to each of the first-speed gear to the fourth-speed gear or reverse gear of the automatic transmission unit 20, may be obtained gear by gear. In addition, when, in the fourth-speed gear of the automatic transmission unit 20, the gear ratio γ0 of the differential unit 11 is controlled to be fixed at, for example, about 0.7 smaller than "1", the total gear ratio γT of, for example, about "0.7" smaller than the fourth-speed gear may be obtained.

Figure 3:
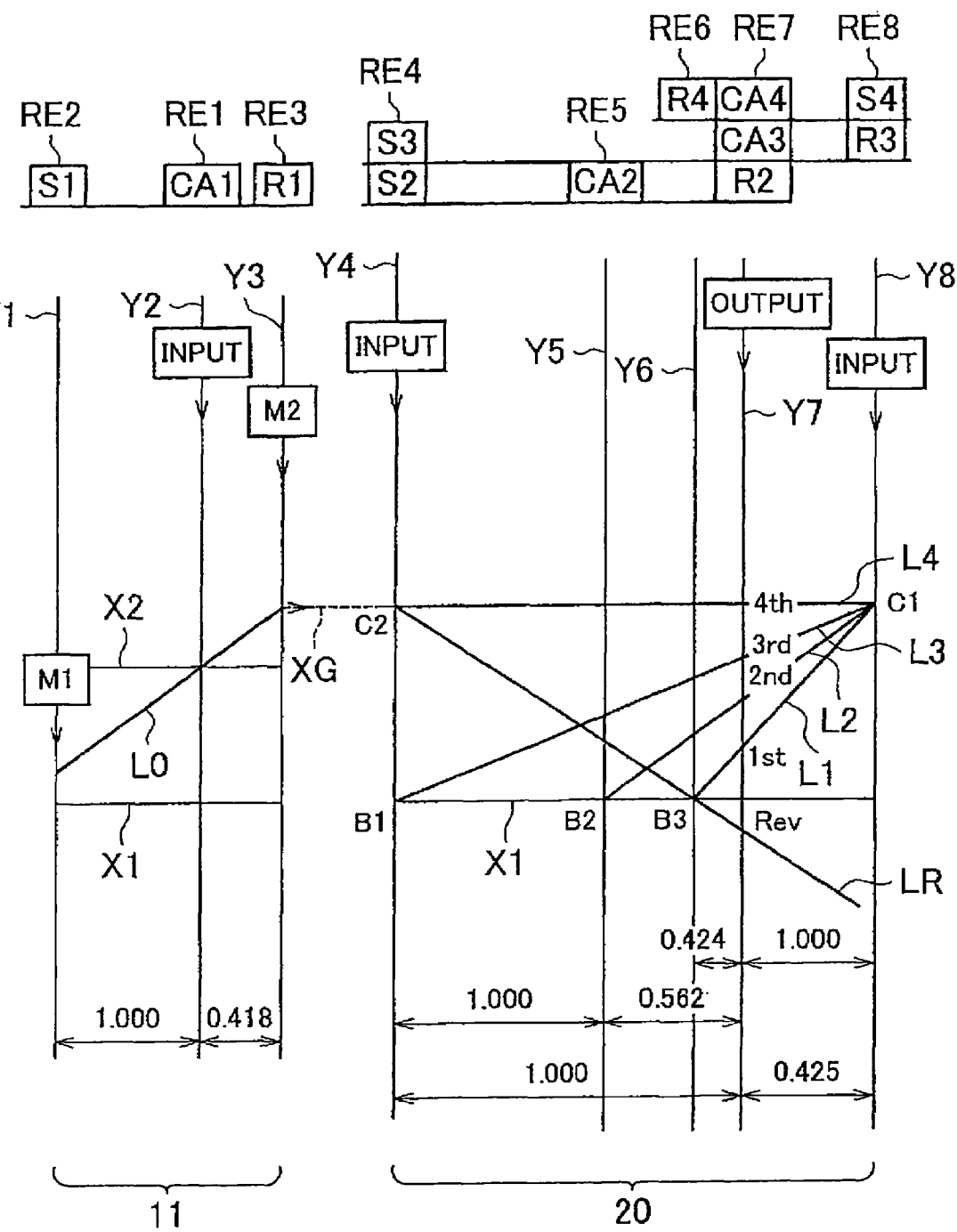
FIG. 3 is a nomograph that illustrates relative rotational speeds in each gear in the power transmission system shown in FIG. 1.

FIG. 3 shows a nomograph that can show the relative relationship in rotational speed among the rotating elements of which coupled states are different among gears in the transmission mechanism 10 formed of the differential unit 11 and the automatic transmission unit 20. The nomograph of FIG. 3 employs a two-dimensional coordinate system formed of an abscissa axis that represents a relationship among gear ratios ρ of the planetary gear sets 24, 26, 28 and 30 and an ordinate axis that represents a relative rotational speed. The horizontal line X1 represents a rotational speed of zero, the horizontal line X2 represents a rotational speed of "1.0", that is, the rotational speed NE of the engine 8 coupled to the input shaft 14, and the horizontal line XG represents the rotational speed of the power transmission member 18.

In addition, three vertical lines Y1, Y2 and Y3 corresponding to three elements of the power distribution mechanism 16 constituting the differential unit 11 represent, starting from the left, the relative rotational speed of the first sun gear S1 corresponding to a second rotating element (second element) RE2, the relative rotational speed of the first carrier CA1 corresponding to a first rotating element (first element) RE1 and the relative rotational speed of the first ring gear R1 corresponding to a third rotating element (third element) RE3. The intervals between those vertical fines Y1, Y2 and Y3 are determined on the basis of the gear ratio ρ1 of the first planetary gear set 24. Furthermore, five vertical lines Y4, Y5, Y6, Y7 and Y8 of the automatic transmission unit 20 respectively represent, starting from the left, the mutually coupled second sun gear S2 and third sun gear S3 corresponding to a fourth rotating element (fourth element) RE4, the second carrier CA2 corresponding to a fifth rotating element (fifth element) RE5, the fourth ring gear R4 corresponding to a sixth rotating element (sixth element) RE6, the mutually coupled second ring gear R2, third carrier CA3 and fourth carrier CA4 corresponding to a seventh rotating element (seventh element) RE7, and the mutually coupled third ring gear R3 and fourth sun gear S4 corresponding to an eighth rotating element (eighth element) RE8. The intervals between those vertical lines Y4, Y5, Y6, Y7 and Y8 are respectively determined on the basis of the gear ratios ρ2, ρ3 and ρ4 of the second, third and fourth planetary gear sets 26, 28 and 30. In the relationship between the vertical lines in the nomograph, when the interval between the sun gear and the carrier is set to an interval corresponding to "1", the interval between the carrier and the ring gear is set to an interval corresponding to the gear ratio ρ of the planetary gear set. That is, in the differential unit 11, the interval between the vertical lines Y1 and Y2 is set to an interval corresponding to "1", and the interval between the vertical lines Y2 and Y3 is set to an interval corresponding to the gear ratio ρ1. In addition, in the automatic transmission unit 20, the interval between the sun gear and the carrier is set to an interval corresponding to "1" for each of the second, third and fourth planetary gear sets 26, 28 and 30, and the interval between the carrier and the ring gear is set to an interval corresponding to ρ for each of the second, third and fourth planetary gear sets 26, 28 and 30.

When expressed using the nomograph of FIG. 3, the transmission mechanism 10 according to the present embodiment is configured to transmit (input) the rotation of the input shaft 14 to the automatic transmission unit 20 via the power transmission member 18 in such a manner that, in the power distribution mechanism 16 (differential unit 11), the first rotating element RE1 (first carrier CA1) of the first planetary gear set 24 is coupled to the input shaft 14, that is, the engine 8, the second rotating element RE2 is coupled to the first electric motor M1, the third rotating element (first ring gear R1) RE3 is coupled to the power transmission member 18 and the second electric motor M2. At this time, the relationship between the rotational speed of the first sun gear S1 and the rotational speed of the first ring gear R1 is shown by an oblique straight line L0 that passes the intersection of Y2 and X2.

For example, when the differential unit 11 is placed in a differential state where the first rotating element RE1 to the third rotating element RE3 are rotatable relative to one another, and when the rotational speed of the first ring gear R1 indicated by the intersection of the straight line L0 and the vertical line Y3 is bound to a vehicle speed V and is substantially constant, as the engine rotational speed NE is controlled to increase or decrease the rotational speed of the first carrier CA1 indicated by the intersection of the straight line L0 and the vertical line Y2, the rotational speed of the first sun gear S1 indicated by the intersection of the straight line L0 and the vertical line Y1, that is, the rotational speed of the first electric motor M1, is increased or decreased.

In addition, when the rotational speed of the first sun gear S1 is adjusted to a rotational speed equal to the engine rotational speed NE in such a manner that the rotational speed of the first electric motor M1 is controlled to fix the gear ratio γ0 of the differential unit 11 at "1", the straight line L0 coincides with the horizontal line X2, and the first ring gear R1, that is, the power transmission member 18, is rotated at the same rotational speed as the engine rotational speed NE. Alternatively, the rotational speed of the first sun gear S1 is set at zero in such a manner that the rotational speed of the first electric motor M1 is controlled to fix the gear ratio γ0 of the differential unit 11 at, for example, about 0.7 smaller than "1", the power transmission member 18 is rotated at the rotational speed $N_{18}$ that is higher than the engine rotational speed NE.

In addition, in the automatic transmission unit 20, the fourth rotating element RE4 is selectively coupled to the power transmission member 18 via the second clutch C2 and selectively coupled to the case 12 via the first brake B1, the fifth rotating element RE5 is selectively coupled to the case 12 via the second brake B2, the sixth rotating element RE6 is selectively coupled to the case 12 via the third brake B3, the seventh rotating element RE7 is coupled to the output shaft 22, and the eighth rotating element RE8 is selectively coupled to the power transmission member 18 via the first clutch C1.

In the automatic transmission unit 20, as the rotation of the power transmission member 18 (third rotating element RE3), which is the output rotating member of the differential unit 11, is input to the eighth rotating element RE8 by engaging the first clutch C1, the first clutch C1 and the third brake B3 are engaged as shown in FIG. 2 and FIG. 3. Thus, the first-speed (1st) rotational speed of the output shaft 22 is indicated by the intersection of the oblique straight line L1 and the vertical line Y7. The oblique straight line L1 passes through the intersection of the vertical line Y8 and the horizontal line XG, indicating the rotational speed of the eighth rotating element RE8, and the intersection of the vertical line Y6 and the horizontal line X1, indicating the rotational speed of the sixth rotating element RE6. The vertical line Y7 indicates the rotational speed of the seventh rotating element RE7 coupled to the output shaft 22. Similarly, the second-speed (2nd) rotational speed of the output shaft 22 is indicated by the intersection of the oblique straight line L2 and the vertical line Y7. The oblique straight line L2 is determined by engaging the first clutch C1 and the second brake B2. The vertical line Y7 indicates the rotational speed of the seventh rotating element RE7 coupled to the output shaft 22. The third-speed (3rd) rotational speed of the output shaft 22 is indicated by the intersection of the oblique straight line L3 and the vertical line Y7. The oblique straight line L3 is determined by engaging the first clutch C1 and the first brake B1. The vertical line Y6 indicates the rotational speed of the seventh rotating element RE7 coupled to the output shaft 22. The fourth-speed (4th) rotational speed of the output shaft 22 is indicated by the intersection of the horizontal straight line L4 and the vertical line Y7. The horizontal straight line L4 is determined by engaging the first clutch C1 and the second clutch C2. The vertical line Y7 indicates the rotational speed of the seventh rotating element RE7 coupled to the output shaft 22.

Figure 4:
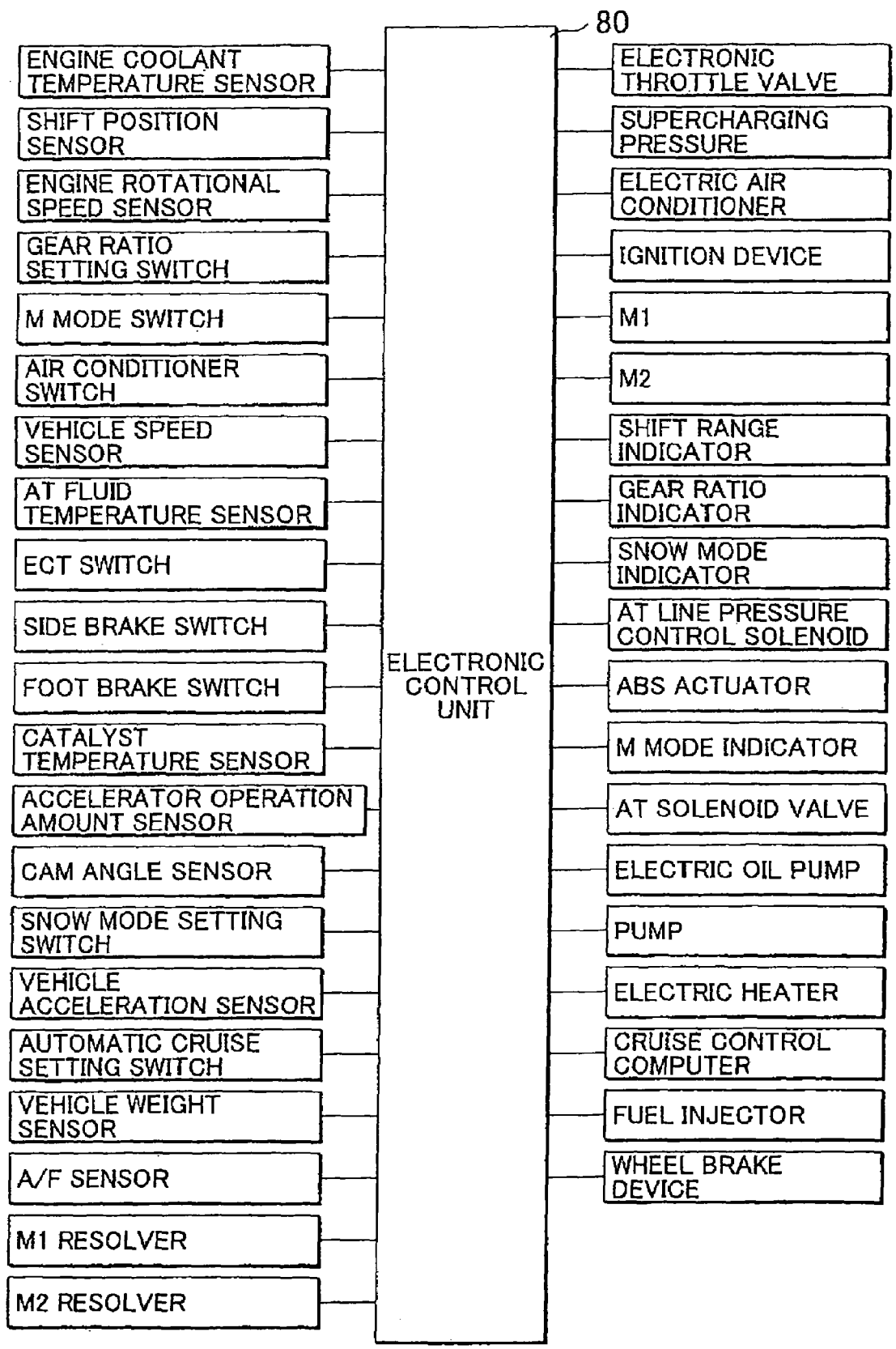
FIG. 4 is a view that illustrates signals input to and output from an electronic control unit provided for the power transmission system shown in FIG. 1.

FIG. 4 show an example of signals input to an electronic control unit 80 and signals output from the electronic control unit 80 for controlling the transmission mechanism 10 according to the present embodiment. The electronic control unit 80 is formed to include a so-called microcomputer provided with a CPU, a ROM, a RAM, an input/output interface, and the like, and utilizes the temporary storage function of the RAM while carrying out signal processing in accordance with a program prestored in the ROM to thereby execute drive control, such as hybrid drive control related to the engine 8 and the first and second electric motors M1 and M2 and shift control of the automatic transmission unit 20.

As shown in FIG. 4, the electronic control unit 80 is supplied from sensors, switches, and the like, with a signal that indicates an engine coolant temperature $TEMP_W$, a signal that indicates a shift position SP of a shift lever 52 (see FIG. 6), the number of operations in "M" position, and the like, a signal that indicates the engine rotational speed NE, which is the rotational speed of the engine 8, a signal that indicates a gear ratio setting value, a signal that issues an instruction for an M mode (manual shift running mode), a signal that indicates an operation of an air conditioner, a signal that indicates a vehicle speed V corresponding to the rotational speed (hereinafter, output shaft rotational speed) $N_{OUT}$ of the output shaft 22, a signal that indicates a hydraulic fluid temperature $T_{OIL}$ of the automatic transmission unit 20, a signal that indicates a side brake operation, a signal that indicates a foot brake operation, a signal that indicates a catalyst temperature, a signal that indicates an accelerator operation amount Acc, which is an amount by which an accelerator pedal is operated, corresponding to an amount of output required by a driver, a signal that indicates a cam angle, a signal that indicates a snow mode setting, a signal that indicates a longitudinal acceleration G of the vehicle, a signal that indicates an automatic cruise running mode, a signal that indicates a weight of the vehicle (vehicle weight), a signal that indicates a wheel speed of each drive wheel, a signal that indicates a rotational speed $N_{M1}$ of the first electric motor M1 (hereinafter, referred to as first electric motor rotational speed $N_{M1}$), a signal that indicates a rotational speed $N_{M2}$ of the second electric motor M2 (hereinafter, referred to as second electric motor rotational speed $N_{M2}$), a signal that indicates a level of charge (state of charge) SOC of an electrical storage device 56 (see FIG. 7), and the like.

In addition, control signals are output from the electronic control unit 80 to an engine output controller 58 (see FIG. 7) that controls engine power. The control signals, for example, include a driving signal supplied to a throttle actuator 64 for operating the throttle opening degree $\theta_{TH}$ of an electronic throttle valve 62 provided in an intake pipe 60 of the engine 8, a fuel supply rate signal for controlling a fuel supply rate into the intake pipe 60 or into a cylinder of the engine 8 by a fuel injector 66, an ignition signal that instructs an ignition device 68 about an ignition timing of the engine 8, a supercharging pressure adjustment signal for adjusting a supercharging pressure, an electric air conditioner driving signal for activating an electric air conditioner, an instruction signal for instructing the electric motors M1 and M2 to be activated, a shift position (operating position) indication signal for activating a shift indicator, a gear ratio indication signal for indicating a gear ratio, a snow mode indication signal for indicating a snow mode, an ABS activation signal for activating an ABS actuator that prevents a slip of drive wheels during braking; an M mode indication signal for indicating that an M mode is selected, a valve instruction signal for operating electromagnetic valves (linear solenoid valves) of a hydraulic control circuit 70 (see FIG. 5 and FIG. 7) in order to control the hydraulic actuators of the hydraulic frictional engagement devices of the differential unit 11 and automatic transmission unit 20, a signal for regulating a line hydraulic pressure $P_L$ by a regulator valve (pressure regulating valve) provided in the hydraulic control circuit 70, a driving instruction signal for operating an electric hydraulic pump, which is a hydraulic pressure source of a source pressure that is regulated to obtain the line hydraulic pressure $P_L$, a signal for driving an electric heater, and a signal to a cruse control computer.

Figure 5:
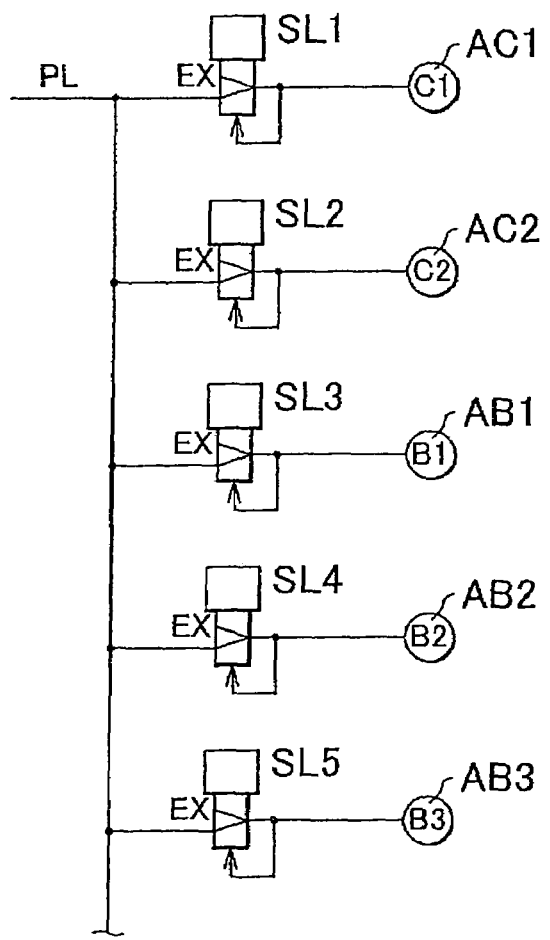
FIG. 5 is a circuit diagram related to linear solenoid valves that control operations of hydraulic actuators of clutches C and brakes B in a hydraulic control system.

FIG. 5 is a circuit diagram related to linear solenoid valves SL1 to SL5 that respectively control operations of the hydraulic actuators (hydraulic cylinders) AC1, AC2, AB1, AB2 and AB3 of the clutches C1 and C2 and brakes B1 to B3 in the hydraulic control circuit 70.

As shown in FIG. 5, the line hydraulic pressure $P_L$ is regulated by the respective linear solenoid valves SL1 to SL5 to engagement pressures PC1, PC2, PB1, PB2 and PB3 in accordance with instruction signals from the electronic control unit 80, and are directly supplied to the respective hydraulic actuators AC1, AC2, AB1, AB2 and AB3. The line hydraulic pressure $P_L$ is regulated at a value corresponding to an engine load, or the like, indicated by an accelerator operation amount or a throttle opening degree by, for example, a relief regulating valve (regulator valve) using a hydraulic pressure, as a source pressure, generated by a mechanical oil pump that is driven for rotation by an electric oil pump (not shown) or the engine 8.

The linear solenoid valves SL1 to SL5 basically have the same configuration. The linear solenoid valves SL1 to SL5 are independently excited or deexcited by the electronic control unit 80 to independently regulate hydraulic pressures supplied to the hydraulic actuators AC1, AC2, AB1, AB2 and AB3, thus controlling the engagement pressures PC1, PC2, PB1, PB2 and PB3 of the clutches C1 to C4 and brakes B1 and B2. Then, the automatic transmission unit 20 establishes each gear in such a manner that the predetermined engagement devices are engaged, for example, as shown in the engagement operation chart of FIG. 2. In addition, in the shift control of the automatic transmission unit 20, for example, a so-called clutch-to-clutch shift is performed. In the clutch-to-clutch shift, engagement and release of the clutches C and brakes B associated with the shift are simultaneously controlled.

Figure 6:
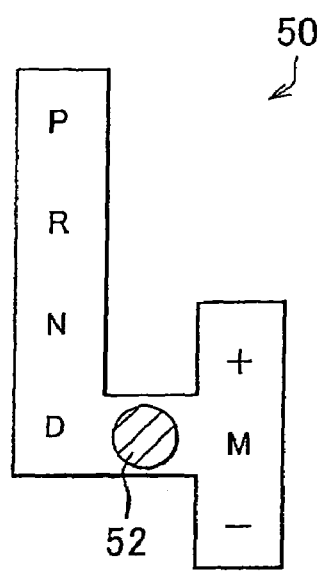
FIG. 6 is an example of a shift operating device applied to the power transmission system according to the embodiment, and the shift operating device is equipped with a shift lever and is operated to select a plurality of types of shift positions.

FIG. 6 is a view that shows an example of a shift operating device 50, which serves as a shifting device for manually shifting a plurality of types of shift positions SP. The shift operating device 50 is, for example, arranged on the side of a driver seat, and includes a shift lever 52. The shift lever 52 is operated to select the plurality of types of shift positions SP.

The shift lever 52 is manually operated to a parking position "P (parking)", a reverse running position "R (reverse)", a neutral position "N (neutral)", an automatic forward running position "D (drive)", or a manual forward running position "M (manual)". In the parking position, the power transmission path in the transmission mechanism 10, that is, in the automatic transmission unit 20, is cut off and placed in a neutral state, and the output shaft 22 of the automatic transmission unit 20 is locked. The reverse running position is used for reverse running. In the neutral position, the power transmission path in the transmission mechanism 10 is cut off and placed in a neutral state. In the automatic forward running position, an automatic transmission mode is established, and automatic transmission control is performed within a variable range of a total gear ratio γT of the transmission mechanism 10, obtained by a stepless gear ratio range of the differential unit 11 and a gear that undergoes automatic transmission control within the range of the first-speed gear to the fourth-speed gear of the automatic transmission unit 20. In the manual forward running position, a manual transmission running mode (manual mode) is established, and a so-called shift range is set to limit a high-speed side gear in the automatic transmission unit 20.

For example, the hydraulic control circuit 70 is electrically switched so that the reverse gear "R", neutral "N", gears in the forward gear "D", and the like, shown in the engagement operation table of FIG. 2 are established as the shift lever 52 is manually operated to the respective shift positions SP.

In the shift positions SP indicated by the "P" to "M" positions, the "P" position and the "N" position are non-running positions that are selected when the vehicle does not run, and are non-driving positions to select switching to a power cutoff state of the power transmission path by the first clutch C1 and the second clutch C2. In the power cutoff state, the power transmission path in the automatic transmission unit 20 is cut off so that both the first clutch C1 and the second clutch C2 are released, for example, as shown in FIG. 2 to make the vehicle undrivable. In addition, the "R" position, the "D" position and the "M" position are running positions that are selected when the vehicle runs, and are driving positions to select switching to a power transmission state of the power transmission path by the first clutch C1 and/or the second clutch C2. In the power transmission state, the power transmission path in the automatic transmission unit 20 is established so that at least one of the first clutch C1 and the second clutch C2 is engaged, for example, as shown in the engagement operation chart of FIG. 2 to make the vehicle drivable.

Specifically, when the shift lever 52 is manually operated from the "P" position or the "N" position to the "R" position, the second clutch C2 is engaged to change the power transmission path in the automatic transmission unit 20 from the power cutoff state to the power transmission state. When the shift lever 52 is manually operated from the "N" position to the "D" position, at least the first clutch C1 is engaged to change the power transmission path in the automatic transmission unit 20 from the power cutoff state to the power transmission state. In addition, when the shift lever 52 is manually operated from the "R" position to the "P" position or the "N" position, the second clutch C2 is released to change the power transmission path in the automatic transmission unit 20 from the power transmission state to the power cutoff state. When the shift lever 52 is manually operated from the "D" position to the "N" position, the first clutch C1 and the second clutch C2 are released to change the power transmission path in the automatic transmission unit 20 from the power transmission state to the power cutoff state.

Figure 7:
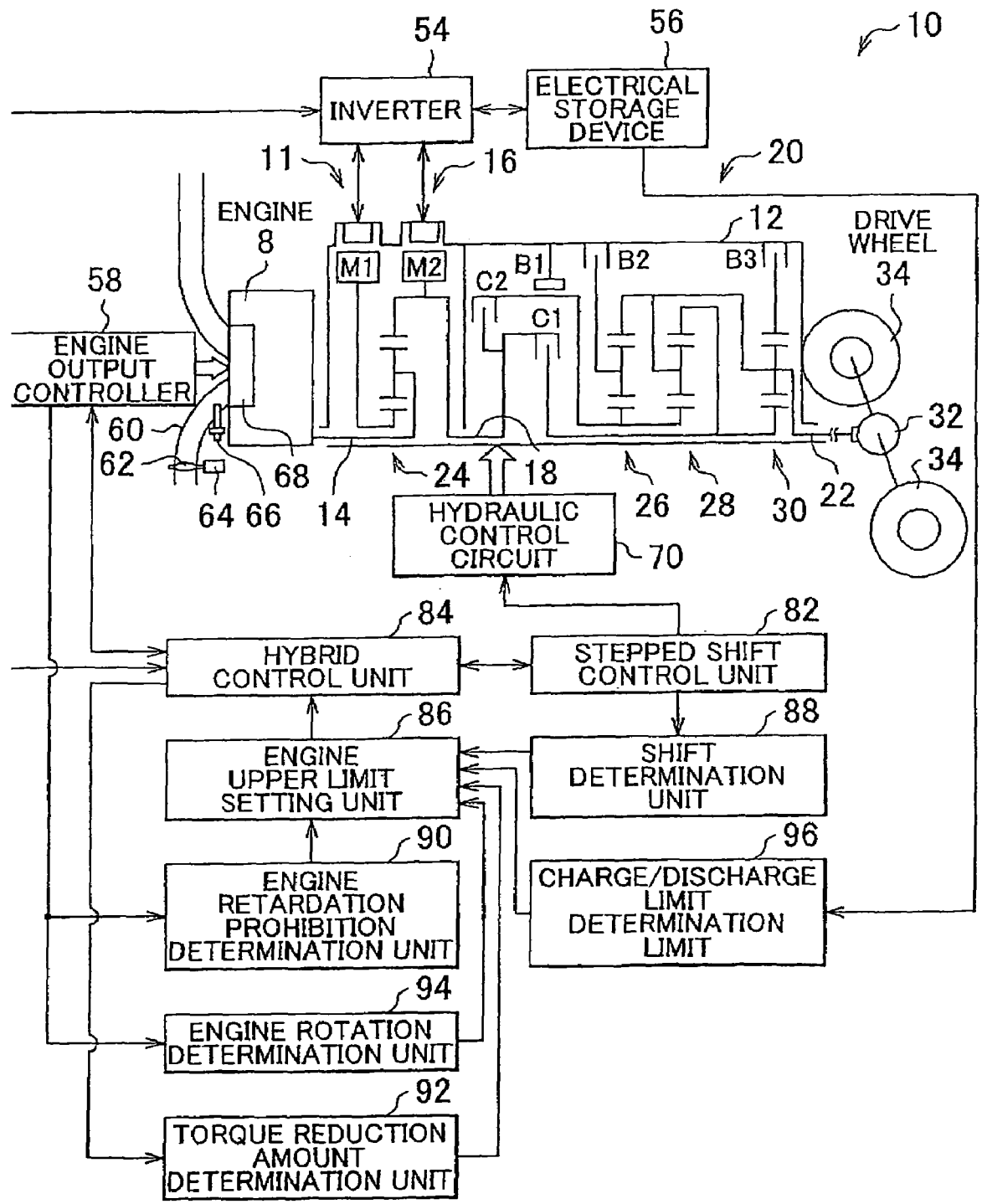
FIG. 7 is a functional block diagram that illustrates a relevant portion of control functions of the electronic control unit shown in FIG. 4.
Figure 8:
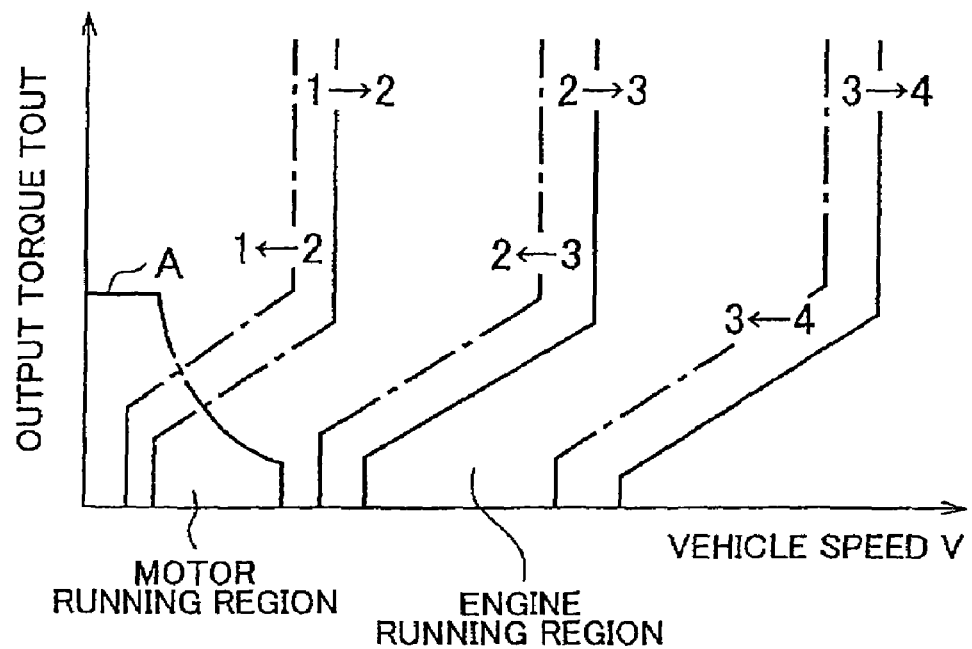
FIG. 8 is an example of a shift line map used in shift control of the power transmission system according to the embodiment, and is an example of a driving source map used in a driving source switching control in which an engine running mode and a motor running mode are switched, and is also a map that shows the relationship between the shift line map and the driving source map.

FIG. 7 is a functional block diagram that illustrate a relevant portion of control functions of the electronic control unit 80. As shown in FIG. 7, a stepped shift control unit 82 determines whether to shift the automatic transmission unit 20, that is, determines a gear into which the automatic transmission unit 20 should shift, on the basis of a vehicle state indicated by an actual vehicle speed V and a required output torque $T_{OUT}$ of the automatic transmission unit 20 by referring to the prestored relationship (shift line map) having upshift lines (solid lines) and downshift lines (alternate long and short dashed line) using a vehicle speed V and an output torque $T_{OUT}$ of the automatic transmission unit 20 as variables as shown in FIG. 8, and then performs automatic transmission control on the automatic transmission unit 20 so as to obtain the determined gear.

At this time, the stepped shift control unit 82 outputs an instruction (shift output instruction, hydraulic pressure instruction) for engaging and/or releasing the hydraulic frictional engagement devices associated with the shift of the automatic transmission unit 20, that is, an instruction for carrying out a clutch-to-clutch shift by releasing the release-side engagement device associated with the shift of the automatic transmission unit 20 and engaging the engage-side engagement device associated with the shift of the automatic transmission unit 20, to the hydraulic control circuit 70 so as to establish the gear, for example, in accordance with the engagement operation chart shown in FIG. 2. In accordance with the instruction, the hydraulic control circuit 70 activates the linear solenoid valves SL in the hydraulic control circuit 70 to actuate the hydraulic actuators of the hydraulic frictional engagement devices associated with that shift so as to, for example, shift the automatic transmission unit 20 by releasing the release-side engagement device while engaging the engage-side engagement device.

A hybrid control unit 84 operates the engine 8 in an efficient operating region while optimally changing a driving force distribution between the engine 8 and the second electric motor M2 and/or a reaction force caused by power generation of the first electric motor M1, thus controlling the gear ratio γ0 of the differential unit 11 as an electric continuously variable transmission. For example, at a vehicle speed V at that time, the hybrid control unit 84 calculates a target (required) output of a vehicle on the basis of an accelerator operation amount Acc, which is an amount of output required by the driver, and the vehicle speed V, calculates a required total target output on the basis of the target output of the vehicle and a required charge value, calculates a target engine output in consideration of a transmission loss, an auxiliary machine load, an assist torque of the second electric motor M2, and the like, so as to obtain the total target output, and then controls the engine 8 so as to attain the engine rotational speed NE and engine torque TE by which the target engine output can be obtained and controls the amount of electric power generated by the first electric motor M1.

Figure 9:
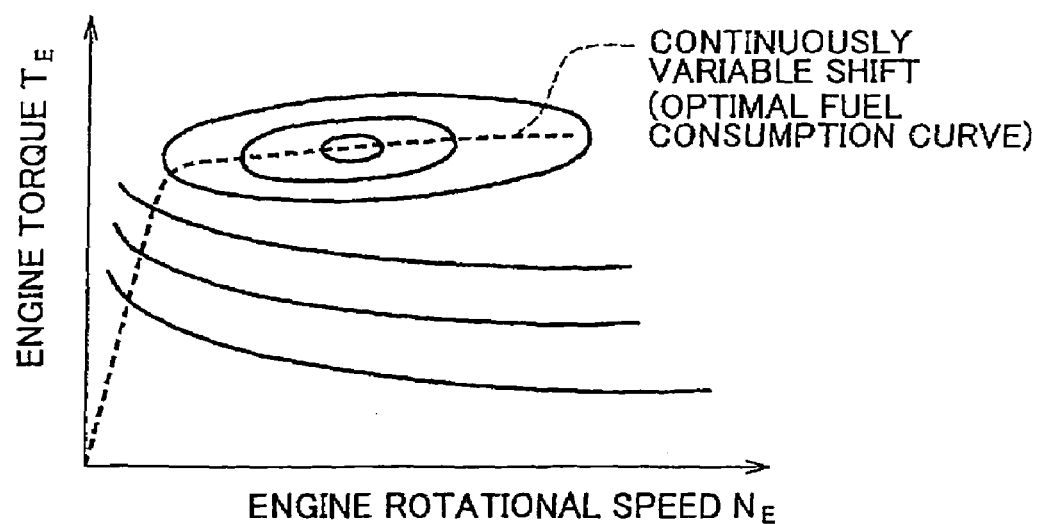
FIG. 9 is an example of a fuel consumption map that shows an optimal fuel consumption curve of an engine.

For example, the hybrid control unit 84 performs the above control in consideration of the gear of the automatic transmission unit 20 in order to improve dynamics, fuel economy, and the like. In this way, in the hybrid control, in order to match the engine rotational speed NE, which is determined to operate the engine 8 at an efficient operating region, with the rotational speed of the power transmission member 18 determined by the vehicle speed V and the gear of the automatic transmission unit 20, the differential unit 11 is caused to function as an electric continuously variable transmission. That is, the hybrid control unit 84 determines a target total gear ratio γT of the transmission mechanism 10 so that the engine 8 is operated along with an optimal fuel consumption rate curve (fuel consumption map, relationship) of the engine 8. For example, the hybrid control unit 84 determines a target total gear ratio γT of the transmission mechanism 10 so as to attain the engine torque TE and the engine rotational speed NE for generating engine output required to achieve a target output (total target output, required driving force). The optimal fuel consumption rate curve is indicated by the broken line in a two dimensional coordinate system of an engine rotational speed NE and an output torque of the engine 8 (engine torque) in FIG. 9. The optimal fuel consumption rate curve is empirically obtained and prestored so as to be compatible between drivability and fuel economy during continuously variable transmission running mode. Then, the hybrid control unit 84 controls the gear ratio γ0 of the differential unit 11 in consideration of the gear of the automatic transmission unit 20 so as to obtain the target total gear ratio γT, and then controls the total gear ratio γT within its variable range.

At this time, the hybrid control unit 84 supplies electric energy generated by the first electric motor M1 to the electrical storage device 56 or to the second electric motor M2 via an inverter 54. Thus, a major portion of the power of the engine 8 is mechanically transmitted to the power transmission member 18. On the other hand, a portion of the power of the engine 8 is consumed for power generation of the first electric motor M1 and converted into electric energy, which is supplied to the second electric motor M2 via the inverter 54 to drive the second electric motor M2, thus being transmitted from the second electric motor M2 to the power transmission member 18. From generation of the electric energy to consumption in the second electric motor M2, associated devices constitute an electrical path that coverts a portion of the power of the engine 8 into electric energy and then converts the electric energy into mechanical energy.

In addition, the hybrid control unit 84 controls the first electric motor rotational speed $N_{M1}$ and/or the second electric motor rotational speed $N_{M2}$ by means of the electric CVT function of the differential unit 11 to maintain the engine rotational speed NE at substantially constant or control the engine rotational speed NE to a selected rotational speed, irrespective of whether the vehicle is stopped or running. In other words, the hybrid control unit 84 maintains the engine rotational speed NE at substantially constant or controls the engine rotational speed NE to a selected rotational speed while making it possible to control the first electric motor rotational speed $N_{M1}$ and/or the second electric motor rotational speed $N_{M2}$ to a selected rotational speed.

For example, as is apparent from the nomograph of FIG. 3, when the hybrid control unit 84 increases the engine rotational speed NE when the vehicle is running, the hybrid control unit 84 maintains the second electric motor rotational speed $N_{M2}$ that is bound to a vehicle speed V (drive wheels 34) at substantially constant while increasing the first electric motor rotational speed $N_{M1}$. In addition, when the hybrid control unit 84 maintains the engine rotational speed NE at substantially constant when the automatic transmission unit 20 is shifting gears, the hybrid control unit 84 maintains the engine rotational speed NE at substantially constant while changing the first electric motor rotational speed $N_{M1}$ in a direction opposite to the direction in which the second electric motor rotational speed $N_{M2}$ varies as the automatic transmission unit 20 shifts gears.

In addition, the hybrid control unit 84 outputs not only an instruction for causing the throttle actuator 64 to open or close the electronic throttle valve 62 for throttle control, but also an instruction for causing the fuel injector 66 to control a fuel injection rate and/or a fuel injection timing for fuel injection control and an instruction for causing the ignition device 68, such as an igniter, to control an ignition timing for ignition timing control, to the engine output controller 58 alone or in combination to thereby control the engine output controller 58 to generate a required engine output, thus controlling the output of the engine 8.

For example, the hybrid control unit 84 basically drives the throttle actuator 64 on the basis of an accelerator operation amount Acc by referring to the prestored relationship (not shown), and performs throttle control such that the throttle opening degree $\theta_{TH}$ increases as the accelerator operation amount Acc increases. In addition, the engine output controller 58 not only controls opening and closing of the electronic throttle valve 62 by the throttle actuator 64 for throttle control in accordance with an instruction from the hybrid control unit 84 but also, for example, controls fuel injection by the fuel injector 66 for fuel injection control and/or controls an ignition timing by the ignition device 68, such as an igniter, for ignition timing control to perform engine torque control.

In addition, the hybrid control unit 84 is able to perform motor running mode by means of the electric CVT function (differential action) of the differential unit 11 irrespective of whether the engine 8 is stopped or idling. For example, the hybrid control unit 84 performs motor running mode in a relatively low output torque $T_{OUT}$ region, that is, a low engine torque TE region, in which engine efficiency is generally lower than that in a high torque region, or in a region in which a vehicle speed is relatively low, that is, a low load region. In addition, during the motor running mode, the hybrid control unit 84 controls the first electric motor rotational speed $N_{M1}$ at a negative rotational speed to idly rotate by, for example, placing the first electric motor M1 in a no-load state, and, where necessary, maintains the engine rotational speed NE at zero or substantially zero by means of the electric CVT function (differential action) of the differential unit 11 in order to improve fuel economy by suppressing a drag of the engine 8 being stopped.

In addition, even in an engine running region, the hybrid control unit 84 supplies electric energy from the first electric motor M1 through the above described electrical path and/or electric energy from the electrical storage device 56 to the second electric motor M2, and then drives the second electric motor M2 to apply torque to the drive wheels 34. By so doing, the hybrid control unit 84 is able to perform so-called torque assist for assisting the power of the engine 8.

In addition, the hybrid control unit 84 places the first electric motor M1 in a no-load state to freely rotate or idle to make it possible to disable the differential unit 11 from transmitting torque, which is equivalent to a state where the power transmission path in the differential unit 11 is cut off and no torque is output from the differential unit 11. That is, the hybrid control unit 84 places the first electric motor M1 in a no-load state to make it possible to set the differential unit 11 in a neutral state where the power transmission path of the differential unit 11 is electrically cut off.

In addition, during coasting with an accelerator off state or during braking with a foot brake, the hybrid control unit 84 functions as a regenerative control unit that drives the second electric motor M2 for rotation to operate as a generator by kinetic energy of the vehicle, that is, reverse driving force transmitted from the drive wheels 34 to the engine 8 side and then charges the electrical storage device 56 with the electric energy, that is, electric current generated by the second electric motor, via the inverter 54 in order to improve fuel economy. The regenerative control is controlled to gain a regeneration amount that is determined on the basis of, for example, a state of charge SOC of the electrical storage device 56 and a braking force distribution to a braking force by a hydraulic brake for obtaining a braking force corresponding to a brake pedal operation amount.

Figure 13:
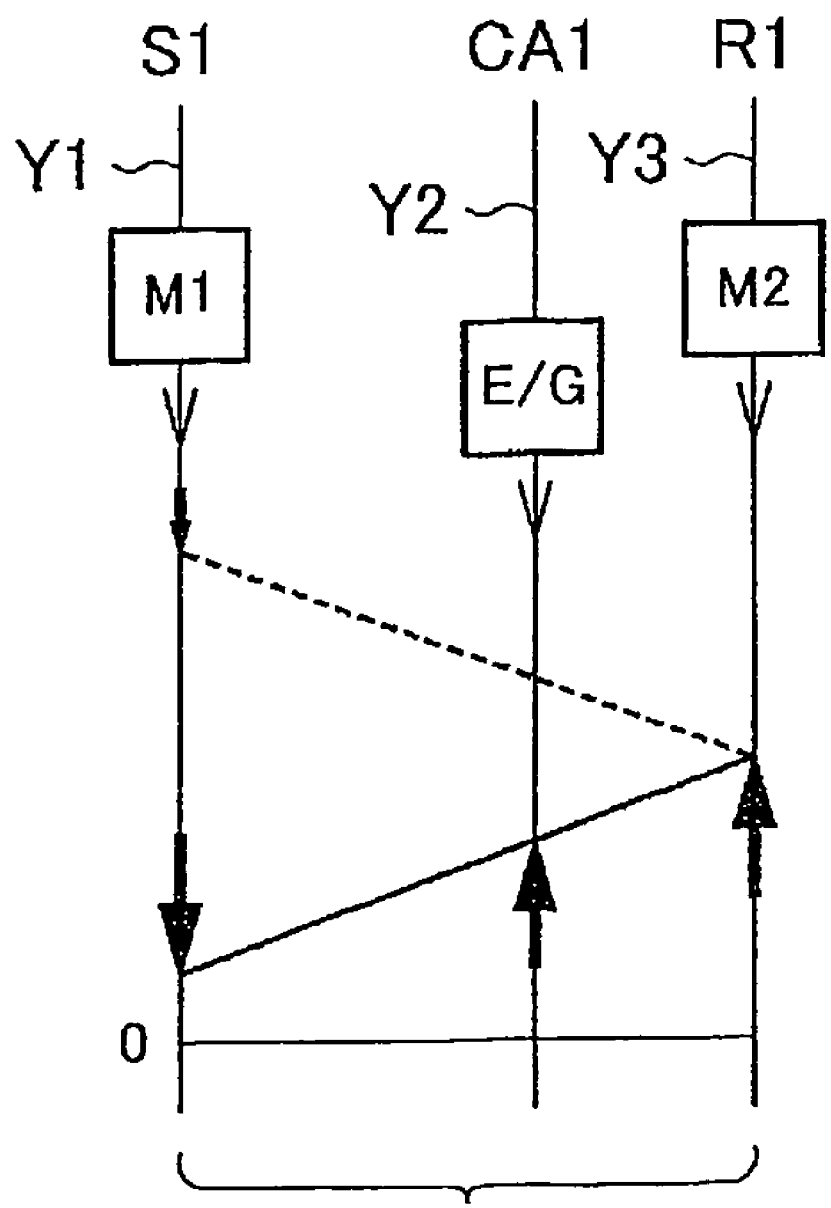
FIG. 13 is an enlarged view of part of the nomograph (left side in FIG. 3) that shows the rotating state of a differential unit in the nomograph shown in FIG. 3.

Incidentally, generally, when the automatic transmission unit 20 shifts gears, torque reduction control is performed to remove inertia torque generated in an inertia phase in order to reduce a shift shock. Here, in the present embodiment, the torque reduction control may be performed by reducing torque of the first electric motor M1 or second electric motor M2 coupled to the differential unit 11. FIG. 13 is a partial view of the nomograph (left side in FIG. 3) that shows the rotational state of the differential unit 11 in the nomograph shown in FIG. 3:

The solid line show in FIG. 13 indicates a state of rotation of the differential unit 11 during steady running. In the state show in FIG. 13, the differential unit 11 is mainly driven by the driving force of the engine 8. A major portion of the driving force of the engine 8 is mechanically transmitted to the power transmission member 18. A portion of the driving force of the engine 8 is converted into electric energy by driving the first electric motor M1 for rotation. Then, the second electric motor M2 is driven by the electric energy to assist engine power. That is, driving torque in a forward direction is generated in the engine 8 and the second electric motor M2, whereas reaction torque caused by power generation is generated in the first electric motor M1.

In the rotating state shown in FIG. 13, when the automatic transmission unit 20 shifts gears, as the shift enters an inertia phase, torque reduction control is performed by the electric motors (mainly, the second electric motor M2). For example, torque reduction control is performed by reducing a driving current supplied to the second electric motor M2, that is, by decreasing a driving force output from the second electric motor M2. Thus, within the electric power generated by the first electric motor M1, the percentage of electric power supplied to the second electric motor M2 decreases, while the percentage of electric power supplied to the electrical storage device 56 increases. In addition, a torque reduction amount that is not removed by the second electric motor M2 is removed by increasing the engine rotational speed NE, that is, by using the inertia of the engine 8. Here, as the state of charge SOC of the electrical storage device 56 falls outside a control target range, driving and power generation of the electric motor (hereinafter, referred to as electric motor when it is not necessary to distinguish the first electric motor M1 and the second electric motor M2 from each other) are limited. For example, as the state of charge SOC reaches a control upper limit, that is, an overcharge region, the amount of electric power generated by the first electric motor M1 is limited, and the amount of torque reduced by the second electric motor M2 is also limited. Thus, in order to reduce the amount of electric power generated by the first electric motor M1, the reaction torque of the first electric motor M1 is reduced. However, in accordance with the reduction in reaction torque of the first electric motor M1, as shown by the broken line in FIG. 13, the rotational speed $N_{M1}$ of the first electric motor M1 and the engine rotational speed NE become relatively high, and, as a result, there has been a possibility that the engine rotational speed NE may possibly reach a high rotational speed region. In addition, as the engine rotational speed NE increases to a rotational speed near the high rotational speed region, in order to decrease the engine rotational speed NE, the electronic throttle valve 62 is, for example, automatically closed (fuel cut) to limit the engine torque. Thus, there has been a possibility that fluctuations in engine torque, that is, a shift shock, may occur.

Then, in the present embodiment, an engine upper limit setting unit 86 is activated to prelimit an upper limit $N_{MAX}$ of the rotational speed NE when the engine rotational speed NE increases during torque reduction control by the electric motor while the automatic transmission unit 20 is shifting gears. Specifically, the upper limit $N_{MAX}$ of the engine rotational speed NE is set at a value lower than the upper limit $N_{MAX}$ when shifting is not performed (regular upper limit). Hereinafter, control operations of the engine upper limit setting unit 86 will be mainly described.

Referring back to FIG. 7, when the automatic transmission unit 20 is shifting gears, the engine upper limit setting unit 86 prelimits the upper limit $N_{MAX}$ of the engine rotational speed NE when the engine rotational speed NE increases because of torque reduction control by the electric motor (second electric motor M2). The engine upper limit setting unit 86 is appropriately activated on the basis of determination results of various determination units, such as a shift determination unit 88, an engine retardation prohibition determination unit 90, a torque reduction amount determination unit 92, and an engine rotation determination unit 94.

The shift determination unit 88 determines whether the automatic transmission unit 20 is shifting gears. The shift determination unit 88 determines whether the automatic transmission unit 20 shifts gears on the basis of, for example, whether the state of the vehicle crosses over an upshift line or a downshift line in the prestored shift line map shown in FIG. 8 or whether a shift instruction signal is output from the stepped shift control unit 82.

The engine retardation prohibition determination unit 90 determines whether retardation control is prohibited. In the retardation control, the ignition timing of the engine 8 is retarded to decrease the driving force of the engine 8. The engine retardation prohibition determination unit 90 determines whether retardation control of the engine 8 is prohibited on the basis of, for example, whether the coolant temperature of the engine 8 is lower than a predetermined temperature or whether the catalyst temperature is higher than a predetermined temperature. Here, when it is determined that retardation control of the engine 8 is prohibited, torque reduction control is performed by the electric motor. Then, the engine upper limit setting unit 86 switches the upper limit $N_{MAX}$ of the engine rotational speed NE when retardation control of the engine 8 is prohibited (when a torque limitation is prohibited). In addition, when retardation control of the engine 8 is allowed, torque reduction control when the automatic transmission unit 20 is shifting gears is preferentially carried out by reducing a torque through retardation control of the engine 8. Note that retardation control of the engine 8 is highly responsive and allows a large torque reduction, so the retardation control of the engine 8 is suitable for torque reduction control when the automatic transmission unit 20 is shifting gears.

When the automatic transmission unit 20 shifts gears, the torque reduction amount determination unit 92 determines a required torque reduction amount, and determines whether the torque reduction amount is larger than a predetermined threshold. The required torque reduction amount is predetermined, for example, on the basis of a shift pattern of the automatic transmission unit 20, the output shaft rotational speed $N_{OUT}$ of the output shaft 22, or the like. The torque reduction amount determination unit 92 determines whether the torque reduction amount is larger than a predetermined threshold. Here, the threshold is empirically or theoretically set in advance, and is, for example, set at a value larger than a torque reduction amount that can be removed (absorbed) by the first electric motor M1 and the second electric motor M2. Then, it is determined whether to switch the upper limit $N_{MAX}$ on the basis of the torque reduction amount. Specifically, when the torque reduction amount exceeds a predetermined threshold, the engine upper limit setting unit 86 is activated, that is, the upper limit $N_{MAX}$ is switched.

The engine rotation determination unit 94 determines whether the engine rotational speed NE at the time when the automatic transmission unit 20 starts shifting gears is higher than a predetermined rotational speed. Note that the predetermined rotational speed is empirically or theoretically set in advance, and is, for example, set at a value near a boundary value at which the engine rotational speed NE is not likely to exceed the upper limit $N_{MAX}$ of the predetermined engine rotational speed NE when the automatic transmission unit 20 shifts gears in a state where the engine 8 is rotated at a predetermined rotational speed. Then, it is determined whether to switch the upper limit $N_{MAX}$ on the basis of the engine rotational speed NE at the time when the automatic transmission unit 20 starts shifting gears. Specifically, when the engine rotational speed NE exceeds a predetermined rotational speed, the engine upper limit setting unit 86 is activated, that is, the upper limit $N_{MAX}$ is switched. Note that the predetermined rotational speed may be changed on the basis of, for example, a torque reduction amount determined by the torque reduction amount determination unit 92, a shift pattern, or the like.

A charge/discharge limit determination unit 96 determines whether the state of charge SOC of the electrical storage device 56 falls within a predetermined range in which charging and discharging of the electrical storage device 56 are limited. When the state of charge SOC falls within the above range, the charge/discharge limit determination unit 96 determines a predetermined charge/discharge limit on the basis of the state of charge SOC. For example, as the state of charge SOC increases, the rate of charge is limited, that is, an allowable amount of electric power generated by the electric motor is limited. Then, the charge/discharge limit determination unit 96 determines an allowable amount of power generation (charge/discharge limit) on the basis of the state of charge SOC.

The engine upper limit setting unit 86 is activated when the shift determination unit 88 determines that the automatic transmission unit 20 is shifting gears, the engine retardation prohibition determination unit 90 determines that retardation control of the engine 8 is prohibited, the torque reduction amount determination unit 92 determines that the torque reduction amount is larger than a predetermined threshold, and the engine rotation determination unit 94 determines that the engine rotational speed NE is higher than a predetermined rotational speed.

The engine upper limit setting unit 86 switches the upper limit $N_{MAX}$ of the engine rotational speed NE to a desired value on the basis of the determination results of the above determination units. FIG. 10 is an example of the upper limit $N_{MAX}$ of the engine rotational speed NE during shifting, the upper limit $N_{MAX}$ being switched by the engine upper limit setting unit 86. Note that, when the automatic transmission unit 20 is not shifting gears, the upper limit $N_{MAX}$ is, for example, set at about 5200 rpm. Thus, as shown in FIG. 10, the switched upper limit values $N_{MAX}$ are set at values lower than the regular upper limit (5200 rpm). In addition, as shown in FIG. 10, the upper limit $N_{MAX}$ is switched on the basis of a shift pattern of the automatic transmission unit 20. For example, when the automatic transmission unit 20 upshifts from the first-speed gear to the second-speed gear, the upper limit $N_{MAX}$ is set at 4700 rpm (when the battery limit is 30 kw), which is relatively high. On the other hand, when the automatic transmission unit 20 downshifts from the fourth-speed gear to the second-speed gear, the upper limit $N_{MAX}$ is set at 4000 rpm (when the battery limit is 30 kw), which is relatively low. In other words, among the shift patterns, as the shift pattern has a larger amount of increase in engine rotational speed based on a difference in gear ratio, or the like, the upper limit $N_{MAX}$ of the engine rotational speed is decreased.

In addition, as shown in FIG. 10, as an allowable amount of electric power generated by the first electric motor M1 (battery limit, charge/discharge limit) decreases, the upper limit $N_{MAX}$ is limited at a lower value. That is, the engine upper limit setting unit 86 determines the amount of power generation allowed by the charge/discharge limit determination unit 96 (battery limit, charge/discharge limit), and then determines the upper limit $N_{MAX}$ on the basis of the determined amount of power generation, for example, as shown in FIG. 10.

Here, the upper limit $N_{MAX}$ may be switched to a desired value not only on the basis of a shift pattern and an allowable amount of power generation but also on the basis of another parameter. For example, the upper limit value $N_{MAX}$ may be switched on the basis of a torque reduction amount. Specifically, when the automatic transmission unit 20 shifts gears, as a torque reduction amount determined by the torque reduction amount determination unit 92 increases, an amount of increase in engine rotational speed NE increases during torque reduction control. Thus, for example, as the torque reduction amount increases, the upper limit $N_{MAX}$ is decreased by a larger amount with respect to the regular upper limit.

In addition, it is possible to determine whether the engine upper limit setting unit 86 switches the upper limit $N_{MAX}$ on the basis of, for example, an input torque from the engine 8, and it is possible to switch the upper limit $N_{MAX}$ to a desired value on the basis of the input torque. For example, when the automatic transmission unit 20 is shifting gears, as the input torque increases, an amount of increase in engine rotational speed NE increases. Thus, when the input torque exceeds a threshold that is empirically set in advance, the engine upper limit setting unit 86 is activated. Furthermore, the engine upper limit setting unit 86 switches the upper limit $N_{MAX}$ to a desired value on the basis of the input torque. Specifically, for example, as the input torque increases, the engine upper limit setting unit 86 decreases the upper limit $N_{MAX}$ by a larger amount with respect to the regular upper limit.

In addition, it is possible to determine whether the engine upper limit setting unit 86 switches the upper limit $N_{MAX}$ on the basis of, for example, a vehicle speed, and it is possible to switch the upper limit $N_{MAX}$ to a desired value on the basis of the vehicle speed. For example, when the vehicle speed is high at the time when the automatic transmission unit 20 starts shifting gears, the engine rotational speed NE falls within a relatively high rotational speed region. Thus, during shifting, it is highly likely that the engine rotational speed NE becomes a high rotational speed. Then, a threshold of the vehicle speed used to determine whether to activate the engine upper limit setting unit 86 is predetermined, and, when the vehicle speed exceeds the threshold, the engine upper limit setting unit 86 is activated. Furthermore, the engine upper limit setting unit 86 switches the upper limit $N_{MAX}$ to a desired value on the basis of the vehicle speed. Specifically, for example, as the vehicle speed increases, the engine upper limit setting unit 86 decreases the upper limit $N_{MAX}$ by a larger amount with respect to the regular upper limit.

In addition, it is possible to determine whether the engine upper limit setting unit 86 switches the upper limit $N_{MAX}$ on the basis of, for example, an accelerator operation amount, and it is possible to switch the upper limit $N_{MAX}$ to a desired value on the basis of the accelerator operation amount. For example, when the automatic transmission unit 20 is shifting gears, as the accelerator operation amount increases, an amount of increase in engine rotational speed NE increases. Thus, when the accelerator operation amount exceeds a threshold that is empirically set in advance, the engine upper limit setting unit 86 is activated. Furthermore, the engine upper limit setting unit 86 switches the upper limit $N_{MAX}$ to a desired value on the basis of the accelerator operation amount. Specifically, for example, as the accelerator operation amount increases, the engine upper limit setting unit 86 decreases the upper limit $N_{MAX}$ by a larger amount with respect to the regular upper limit.

In addition, the engine upper limit setting unit 86 is able to switch the upper limit value $N_{MAX}$ on the basis of, for example, an overrevolution determination rotational speed of the engine 8. When the overrevolution determination rotational speed of the engine 8 varies on the basis of, for example, a coolant temperature of the engine 8, the upper limit $N_{MAX}$ is switched to a desired value accordingly. For example, as the overrevolution determination rotational speed decreases with an increase in coolant temperature, the engine upper limit setting unit 86 decreases the upper limit $N_{MAX}$ accordingly.

As described above, the upper limit value $N_{MAX}$ may be switched on the basis of the above described parameters.

Here, the upper limit $N_{MAX}$ may be not only independently set on the basis of each of the parameters but also set so that a two or more dimensional upper limit switching map (or relational expression) is preset on the basis of selected parameters among the above parameters and then the engine upper limit setting unit 86 comprehensively sets the upper limit $N_{MAX}$ on the basis of the upper limit switching map (or relational expression).

Figure 11:
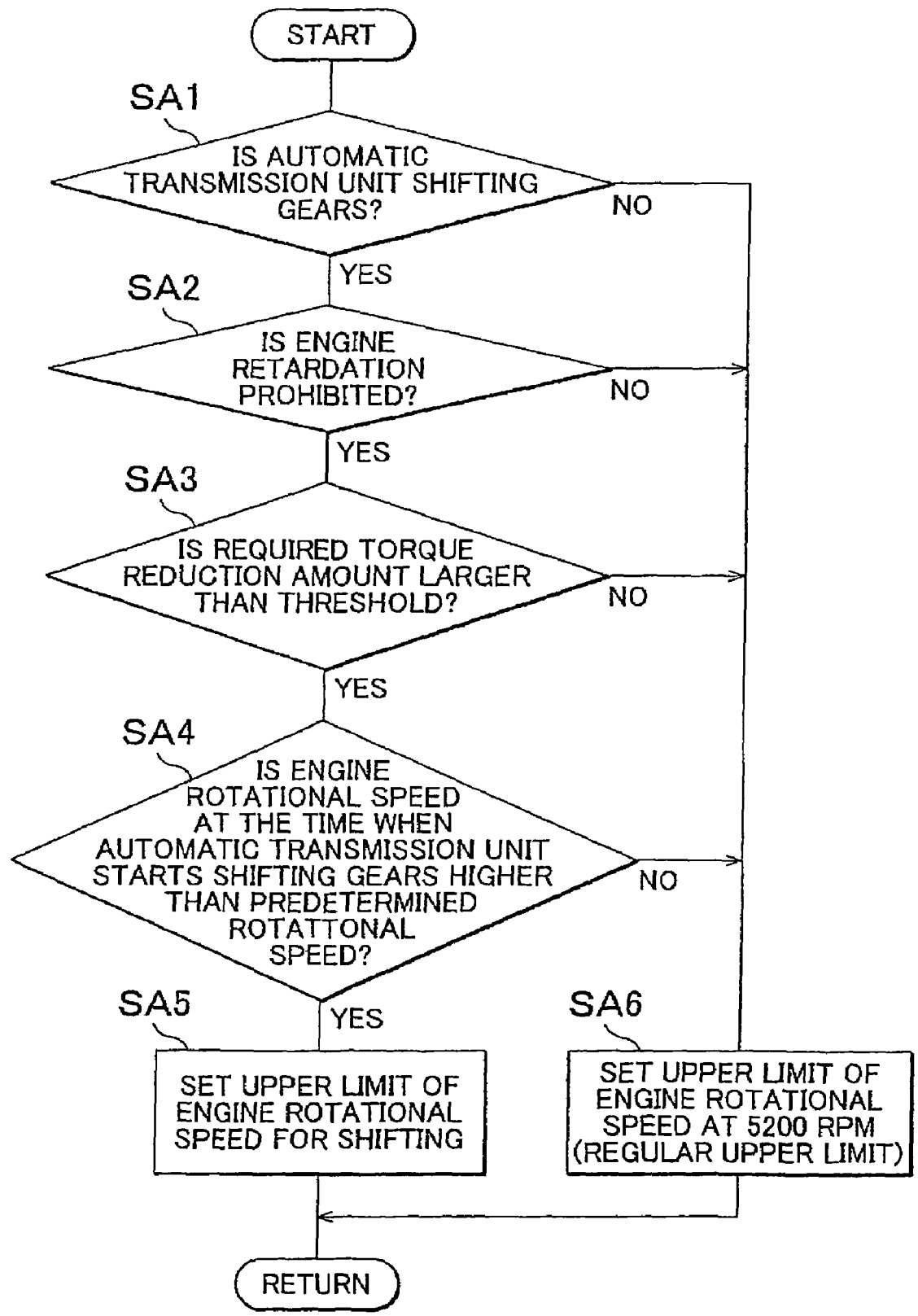
FIG. 11 is a flowchart that illustrates control operations of the controller according to the embodiment, by which the engine rotational speed is prevented from reaching a high rotational speed region when an automatic transmission unit shifts gears.

FIG. 11 is a flowchart that illustrates a relevant portion of control operations of the electronic control unit 80, that is, control operations that prevent a situation that the engine rotational speed NE reaches a high rotational speed region when the automatic transmission unit 20 shifts gears. The flowchart is repeatedly executed at extremely short intervals of, for example, about several milliseconds to several tens of milliseconds.

First, in step SA1 corresponding to the shift determination unit 88, it is determined whether the automatic transmission unit 20 is shifting gears. When the negative determination is made in SA1, the upper limit of the engine rotational speed NE is set at a regular upper limit (for example, about 5200 rpm) in SA6. Here, the regular upper limit $N_{MAX}$ of the engine rotational speed NE is set on the basis of the specifications of the engine 8, and is set at a rotational speed in consideration of, for example, a decrease in durability due to high-speed rotation of the engine 8. Note that as the engine rotational speed NE exceeds the upper limit $N_{MAX}$, fuel cut of the engine 8 is automatically carried out to decrease the engine rotational speed. When the affirmative determination is made in SA1, it is determined in SA2, corresponding to the engine retardation prohibition determination unit 90, whether retardation control of the engine 8 is prohibited. When the negative determination is made in SA2, it is determined that it is possible to reduce torque by retardation control of the engine 8, and, in SA6, the upper limit $N_{MAX}$ is set at the regular upper limit $N_{MAX}$.

On the other hand, when the affirmative determination is made in SA2, it is determined in SA3, corresponding to the torque reduction amount determination unit 92, whether a torque reduction amount required when the automatic transmission unit 20 shifts gears is larger than a predetermined threshold. When the negative determination is made in SA3, it is determined that it is possible to reduce torque by torque reduction control using the second electric motor M2, and, in SA6, the upper limit $N_{MAX}$ is set at the regular upper limit $N_{MAX}$. When the affrative determination is made in SA3, it is determined in SA4, corresponding to the engine rotation determination unit 94, whether the engine rotational speed NE at the time when the automatic transmission unit 20 starts shifting gears is higher than a predetermined rotational speed. When the negative determination is made in SA4, it is determined that the engine rotational speed NE does not reach the upper limit $N_{MAX}$ even when the engine rotational speed NE increases because of shift of the automatic transmission unit 20, and, in SA6, the upper limit $N_{MAX}$ is set at the regular upper limit $N_{MAX}$.

On the other hand, when the affirmative determination is made in SA4, in SA5 corresponding to the engine upper limit setting unit 86, the upper limit $N_{MAX}$ of the engine rotational speed NE is set at a desired value on the basis of, for example, a shift pattern of the automatic transmission unit 20, an amount of power generation (charge/discharge limit) allowed by the charge/discharge limit determination unit 96, and the like.

Figure 12:
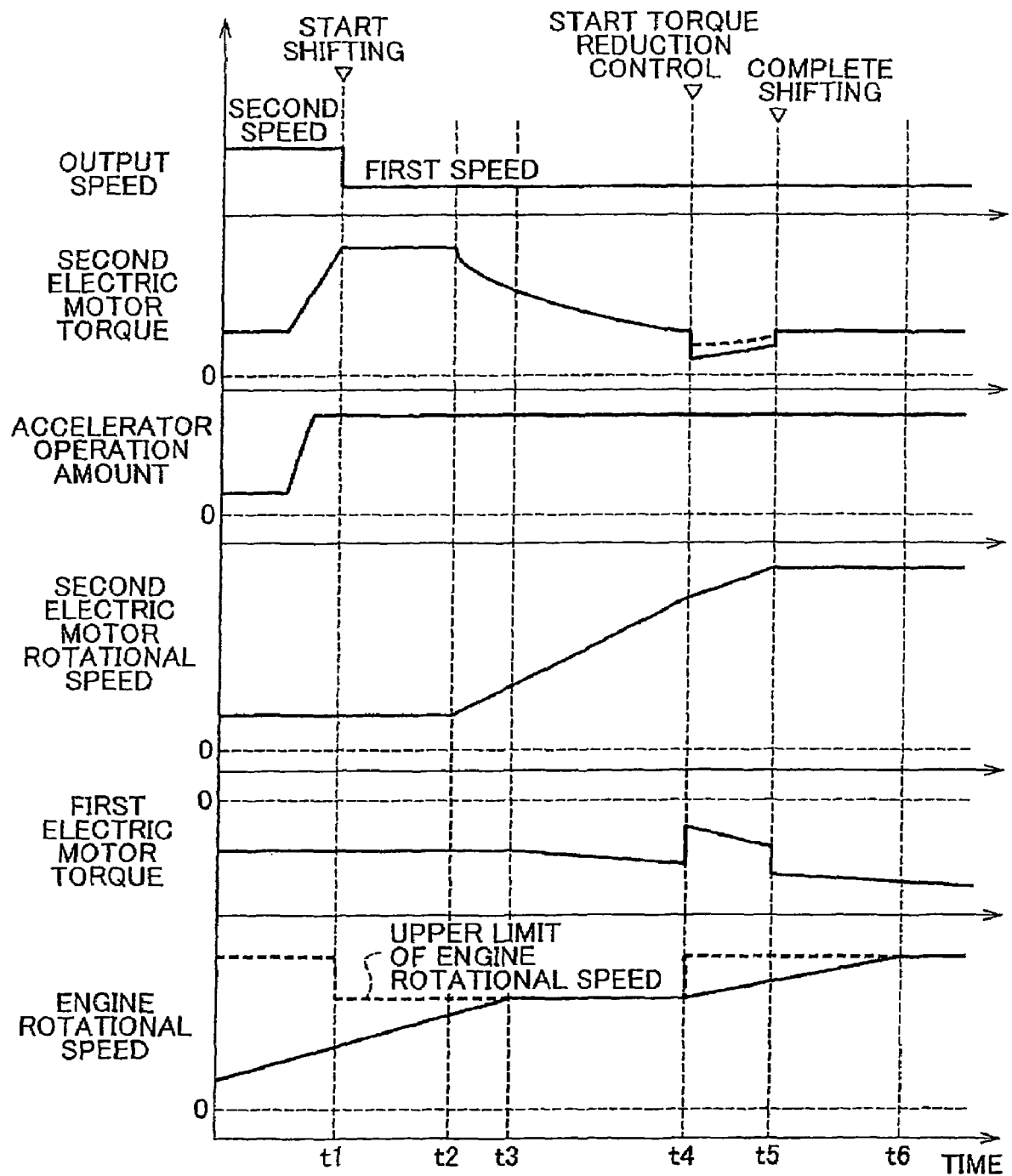
FIG. 12 is a time chart that illustrate control operations of the controller according to the embodiment, by which the engine rotational speed is prevented from reaching the high rotational speed region when the automatic transmission unit shifts gears.

FIG. 12 is a time chart that illustrates a relevant portion of control operations of the electronic control unit 80, that is, control operations that prevent the engine rotational speed from reaching a high rotational speed region when the automatic transmission unit 20 shifts gears. Note that FIG. 12 illustrates a power-on downshift caused by depressing an accelerator pedal as an example.

At time t1, as the automatic transmission unit 20 starts shifting gears on the basis of a shift determination for the automatic transmission unit 20, the upper limit $N_{MAX}$ of the engine rotational speed NE is immediately set at a rotational speed indicated by the broken line. That is, the time t1 corresponds to step SA1 in the flowchart shown in FIG. 12, and, soon after that, steps SA2 to SA6 are immediately carried out. Then, at time t2, as the inertia phase of the automatic transmission unit 20 starts, the rotational speed $N_{M2}$ of the second electric motor M2 increases. Then, at time t3, as the inertia phase progresses, the engine rotational speed NE would further increase. However, the upper limit $N_{MAX}$ of the engine rotational speed NE is set as indicated by the broken line, an increase in engine rotational speed NE is limited by, for example, controlling the rotational speed of the first electric motor M1. Then, at time t4, torque reduction control is initiated in accordance with the shift of the automatic transmission unit 20. Specifically, between time t4 to time t5, as indicated by the solid line, the output torque from the second electric motor M2 is reduced to perform torque reduction. At this time, when the state of charge SOC of the electrical storage device 56 exceeds a limited range, the amount of electric power generated by the first electric motor M1 is limited. That is, a torque reduction amount by the second electric motor M2 is limited as indicated by the broken line, and the amount of electric power generated by the first electric motor M1 is limited. In accordance with this, the remaining portion of the torque reduction amount that cannot be removed by the first electric motor M1 and the second electric motor M2 will be removed by increasing the engine rotational speed NE. Specifically, by reducing the reaction torque of the first electric motor M1 (for reducing the amount of power generation), the engine rotational speed NE is increased to remove the remaining portion of the torque reduction amount. Note that at time t4 at which the torque reduction control is carried out, the upper limit $N_{MAX}$ of the engine rotational speed NE is returned to the regular upper limit (for example, about 5200 rpm). In other words, control of the engine rotational speed NE by the first electric motor M1 (the engine rotational speed NE is controlled to within the upper limit) is terminated.

Here, as the control of the engine rotational speed NE by the first electric motor M1 is terminated, the engine rotational speed NE increases between time t4 and time t5. At this time, before start of the torque reduction control (between time t1 and time t4), the upper limit $N_{MAX}$ of the engine rotational speed NE is prelimited to a value lower than the regular upper limit. Thus, the engine rotational speed NE during torque reduction control (between time t4 and time t5) is prevented from reaching the regular upper limit (for example, about 5200 rpm). Then, at time t5, as the automatic transmission 20 completes the shift, engine rotational speed control is carried out again using the first electric motor M1. Then, for example, as the engine rotational speed NE increases to the regular upper limit $N_{MAX}$ at time t6, an increase in engine rotational speed NE is suppressed by the first electric motor M1.

As described above, according to the present embodiment, while the automatic transmission unit 20 is shifting gears, when the engine rotational speed NE increases because of torque reduction control by the first electric motor M1 and the second electric motor M2, the engine upper limit setting unit 86, which prelimits the upper limit $N_{MAX}$ of the engine rotational speed NE, suppresses an increase in engine rotational speed NE, thus preventing the engine rotational speed NE from reaching a high rotational speed region. In addition, in accordance with this, an engine torque limitation by, for example, closing the electronic throttle valve 62 is prevented. Thus, it is possible to prevent a shift shock associated with the engine torque limitation.

In addition, according to the present embodiment, the engine upper limit setting unit 86 switches the upper limit $N_{MAX}$ of the engine rotational speed NE when a torque limitation of the engine 8 is prohibited. Thus, when an engine torque limitation is prohibited, that is, when the engine rotational speed NE tends to reach a high rotational speed region, the upper limit $N_{MAX}$ of the engine rotational speed NE is switched to a desired value. Thus, even when the engine rotational speed NE increases with the progress of shift of the automatic transmission unit 20, the engine rotational speed NE is effectively prevented from reaching a high rotational speed region.

In addition, according to the present embodiment, on the basis of the engine rotational speed NE at the time when the automatic transmission unit 20 starts shifting gears, it is determined whether the engine upper limit setting unit 86 switches the upper limit $N_{MAX}$, so the upper limit $N_{MAX}$ is switched appropriately. For example, when the engine rotational speed NE at the time when the automatic transmission unit 20 starts shifting gears falls within a high rotational speed region, the upper limit $N_{MAX}$ is switched to a desired value. Thus, even when the engine rotational speed NE increases with the progress of shift of the automatic transmission unit 20, the engine rotational speed NE is effectively prevented from reaching a high rotational speed region. On the other hand, when the engine rotational speed NE at the time when the automatic transmission unit 20 starts shifting gears falls within a low rotational speed region, the engine rotational speed NE does not reach the high rotational speed region even when the upper limit $N_{MAX}$ is not switched, so the above control will not be carried out. Thus, it is possible to prevent a decrease in driving force by unnecessarily suppressing engine rotation.

In addition, according to the present embodiment, on the basis of a torque reduction amount required at the time when the automatic transmission unit 20 shifts gears, it is determined whether the engine upper limit setting unit 86 switches the upper limit $N_{MAX}$, so the upper limit $N_{MAX}$ is switched appropriately. For example, when the required torque reduction amount is by far larger than a torque reduction amount that can be ensured by the first electric motor M1 and the second electric motor M2, the upper limit $N_{MAX}$ is switched to a desired value. Thus, even when the engine rotational speed NE increases with the progress of shift of the automatic transmission unit 20, the engine rotational speed NE is effectively prevented from reaching a high rotational speed region. On the other hand, when the required torque reduction amount can be sufficiently ensured by the first electric motor M1 and the second electric motor M2, the engine rotational speed NE does not reach the high rotational speed region even when the upper limit $N_{MAX}$ is not switched, so the above control will not be carried out. Thus, it is possible to prevent a decrease in driving force by unnecessarily suppressing engine rotation.

In addition, according to the present embodiment, on the basis of an input torque from the engine 8, it is determined whether the engine upper limit setting unit 86 switches the upper limit $N_{MAX}$, so the upper limit $N_{MAX}$ is switched appropriately. For example, when the input torque from the engine 8 is large, because the engine rotational speed NE tends to reach a high rotational speed region as the automatic transmission unit 20 shifts gears, the upper limit $N_{MAX}$ is switched to a desired value. Thus, even when the engine rotational speed NE increases with the progress of shift of the automatic transmission unit 20, the engine rotational speed NE is effectively prevented from reaching a high rotational speed region. On the other hand, when the input torque is small, the engine rotational speed NE does not reach the high rotational speed region even when the upper limit $N_{MAX}$ is not switched, so the above control will not be carried out. Thus, it is possible to prevent a decrease in driving force by unnecessarily suppressing engine rotation.

In addition, according to the present embodiment, on the basis of a vehicle speed, it is determined whether the engine upper limit setting unit 86 switches the upper limit $N_{MAX}$, so the upper limit $N_{MAX}$ is switched appropriately. For example, when the vehicle speed falls within a high vehicle speed region, the torque reduction amount is large, so the engine rotational speed tends to reach a high rotational speed region. Then, by switching the upper limit $N_{MAX}$ to a desired value, it is possible to effectively prevent the engine rotational speed NE from reaching the high rotational speed region. On the other hand, when the vehicle speed falls within a low vehicle speed region, the torque reduction amount is small. Thus, the engine rotational speed NE does not reach the high rotational speed region even when the upper limit $N_{MAX}$ is not switched, so the above control will not be carried out. Thus, a load on control due to the above control is reduced.

In addition, according to the present embodiment, on the basis of a charge/discharge limit of the electrical storage device 56, it is determined whether the engine upper limit setting unit 86 switches the upper limit $N_{MAX}$, so the upper limit $N_{MAX}$ is switched appropriately. For example, when the state of charge SOC of the electrical storage device 56 exceeds a charge limit, power generation by the first electric motor M1 or the second electric motor M2 is limited. In accordance with this, a torque reduction amount that can be ensured (removed) by the second electric motor M2 is limited. Thus, the engine rotational speed NE is increased and tends to reach a high rotational speed region. However, by switching the upper limit $N_{MAX}$ to a desired value in advance, it is possible to effectively prevent the engine rotational speed NE from reaching the high rotational speed region. On the other hand, when power generation by the first electric motor M1 and the second electric motor M2 is not limited, and it is possible to sufficiently ensure (remove) a torque reduction amount by the second electric motor M2, the engine rotational speed NE does not reach a high rotational speed region even when the upper limit $N_{MAX}$ is not switched, so the above control will not be carried out. Thus, it is possible to prevent a decrease in driving force by unnecessarily suppressing engine rotation.

In addition, according to the present embodiment, on the basis of an accelerator operation amount, it is determined whether the engine upper limit setting unit 86 switches the upper limit $N_{MAX}$, so the upper limit $N_{MAX}$ is switched appropriately. For example, when the accelerator operation amount is large, the engine rotational speed NE tends to reach a high rotational speed region as the automatic transmission unit 20 shifts gears. Then, by switching the upper limit $N_{MAX}$ to a desired value, it is possible to effectively prevent the engine rotational speed NE from reaching the high rotational speed region. On the other hand, when the accelerator operation amount is small, the engine rotational speed NE does not reach the high rotational speed region even when the upper limit $N_{MAX}$ is not switched, so the above control will not be carried out. Thus, it is possible to prevent a decrease in driving force by unnecessarily suppressing engine rotation.

In addition, according to the present embodiment, on the basis of a shift pattern of the automatic transmission unit 20, it is determined whether the engine upper limit setting unit 86 switches the upper limit $N_{MAX}$, so the upper limit $N_{MAX}$ is switched appropriately. For example, in the case of a shift having a large variation in rotational speed when the automatic transmission unit 20 shifts gears, the engine rotational speed NE tends to reach a high rotational speed region as the automatic transmission unit 20 shifts gears. In the above case, by switching the upper limit $N_{MAX}$ to a desired value, it is possible to effectively prevent the engine rotational speed NE from reaching the high rotational speed region. On the other hand, in the case of a shift that does not increase the engine rotational speed NE to the high rotational speed region, the above control will not be carried out. Thus, it is possible to prevent a decrease in driving force by unnecessarily suppressing engine rotation.

In addition, according to the present embodiment, the upper limit $N_{MAX}$ of the engine rotational speed NE is switched on the basis of a torque reduction amount required when the automatic transmission unit 20 is shifting gears. Thus, the upper limit $N_{MAX}$ is switched to a desired value on the basis of the torque reduction amount, and it is possible to effectively prevent the engine rotational speed NE from reaching a high rotational speed region. For example, the upper limit $N_{MAX}$ is decreased as the torque reduction amount increases, so it is possible to effectively prevent the engine rotational speed NE from reaching the high rotational speed region.

In addition, according to the present embodiment, the upper limit $N_{MAX}$ of the engine rotational speed NE is switched on the basis of the input torque from the engine 8. Thus, the upper limit $N_{MAX}$ is switched to a desired value on the basis of the input torque, and it is possible to effectively prevent the engine rotational speed NE from reaching a high rotational speed region. For example, the upper limit $N_{MAX}$ is decreased as the input torque increases, so it is possible to effectively prevent the engine rotational speed NE from reaching the high rotational speed region.

In addition, according to the present embodiment, the upper limit $N_{MAX}$ of the engine rotational speed NE is switched on the basis of the vehicle speed. Thus, the upper limit $N_{MAX}$ is switched to a desired value on the basis of the vehicle speed, and it is possible to effectively prevent the engine rotational speed NE from reaching a high rotational speed region. For example, the upper limit $N_{MAX}$ is decreased as the vehicle speed increases. Thus, it is possible to effectively prevent the engine rotational speed NE from reaching the high rotational speed region.

In addition, according to the present embodiment, the upper limit $N_{MAX}$ of the engine rotational speed NE is switched on the basis of the charge/discharge limit of the electrical storage device 56. Thus, the upper limit $N_{MAX}$ is switched to a desired value on the basis of the charge/discharge limit of the electrical storage device 56, and it is possible to effectively prevent the engine rotational speed NE from reaching a high rotational speed region.

In addition, according to the present embodiment, the upper limit $N_{MAX}$ of the engine rotational speed NE is switched on the basis of the accelerator operation amount. Thus, the upper limit $N_{MAX}$ is switched to a desired value on the basis of the accelerator operation amount, and it is possible to effectively prevent the engine rotational speed NE from reaching a high rotational speed region. For example, the upper limit $N_{MAX}$ is decreased as the accelerator operation amount increases, so it is possible to effectively prevent the engine rotational speed NE from reaching the high rotational speed region.

In addition, according to the present embodiment, the upper limit $N_{MAX}$ of the engine rotational speed NE is switched on the basis of the shift pattern of the automatic transmission unit 20. Thus, the upper limit $N_{MAX}$ is switched to a desired value on the basis of the shift pattern of the automatic transmission unit 20, and it is possible to effectively prevent the engine rotational speed NE from reaching the high rotational speed region. For example, for a shift of the automatic transmission unit 20, which tends to cause the engine rotational speed NE to reach the high rotational speed region, the upper limit $N_{MAX}$ is decreased. Thus, it is possible to effectively prevent the engine rotational speed NE from reaching the high rotational speed region.

In addition, according to the present embodiment, the upper limit $N_{MAX}$ of the engine rotational speed NE is switched on the basis of the overrevolution determination rotational speed of the engine. Thus, the upper limit $N_{MAX}$ is switched to a desired value on the basis of the overrevolution determination rotational speed, and it is possible to effectively prevent the engine rotational speed NE from reaching the high rotational speed region.

The embodiment of the invention is described with reference to the accompanying drawings; however, the aspect of the invention is also applied to another embodiment.

For example, in the above embodiment, the upper limit $N_{MAX}$ of the engine rotational speed NE is determined on the basis of the shift pattern of the automatic transmission unit 20 and the allowable amount of power generation based on the state of charge SOC of the electrical storage device 56. Instead, the upper limit $N_{MAX}$ of the engine rotational speed NE may be set additionally in consideration of the above described torque reduction amount, input torque, vehicle speed, accelerator operation amount, or the like. In other words, parameters selected from the above parameters are selected, a two or more dimensional upper limit switching map having a combination of those parameters is empirically set in advance, or the like, and then the upper limit $N_{MAX}$ may be determined on the basis of the upper limit switching map. Note that the upper limit $N_{MAX}$ may be determined on the basis of one parameter, such as only a torque reduction amount.

In addition, in the above embodiment, a specific value of the upper limit $N_{MAX}$ is just an example, and may be varied where appropriate on the basis of the specifications of the engine 8, the automatic transmission unit 20, or the like, which is used.

In addition, in the above embodiment, the upper limit $N_{MAX}$ is switched on the basis of each shift pattern of the automatic transmission unit 20; however, the upper limit may be set to the regular upper limit depending on a shift pattern, that is, the upper limit may be not switched depending on a shift pattern. Thus, on the basis of the shift pattern of the automatic transmission unit 20, it is determined whether the engine upper limit setting unit 86 switches the upper limit $N_{MAX}$.

In addition, in the above embodiment, the charge/discharge limit determination unit 96 determines whether the state of charge SOC of the electrical storage device 56 falls within a predetermined range in which charging and discharging of the electrical storage device 56 are limited, and, when the state of charge SOC falls within that range, a predetermined charge/discharge limit is determined on the basis of the state of charge SOC. However, for example, a determination as to whether the upper limit $N_{MAX}$ is switched may be made on the basis of whether the state of charge SOC falls within a limited range.

In addition, in the above embodiment, the differential unit 11 functions as an electric continuously variable transmission in which the gear ratio γ0 is continuously varied from a minimum value γ0 min to a maximum value γ0 max. Instead, for example, the aspect of the invention may also be applied to the differential unit 11 of which the gear ratio γ0 is not continuously varied but intentionally varied in a stepped manner using the differential function.

In addition, in the above embodiment, the differential unit 11 may include a differential restriction device that is provided for the power distribution mechanism 16 to restrict the differential action to thereby operate as at least forward two-speed stepped transmission.

In addition, in the power distribution mechanism 16 according to the above embodiment, the first carrier CA1 is coupled to the engine 8, the first sun gear S1 is coupled to the first electric motor M1, and the first ring gear R1 is coupled to the power transmission member 18; however, the relationship of coupling those elements are not specifically limited. Instead, the engine 8, the first electric motor M1 and the power transmission member 18 may be coupled to any of three elements CA1, S1 and R1 of the first planetary gear set 24.

In addition, in the above embodiment, the engine 8 is directly coupled to the input shaft 14. However, it is only necessary that the engine 8 is operatively coupled to the input shaft 14 via, for example, a gear, a belt, or the like, and the engine 8 does not need to be arranged coaxially with the input shaft 14.

In addition, in the above embodiment, the first electric motor M1 and the second electric motor M2 are arranged concentrically with the input shaft 14, the first electric motor M1 is coupled to the first sun gear S1, and the second electric motor M2 is coupled to the power transmission member 18; however, the arrangement is not necessarily limited to that. Instead, the first electric motor M1 may be operatively coupled to the first sun gear S1 and the second electric motor M2 is operatively coupled to the power transmission member 18 via, for example, a gear, a belt, a reduction gear, and the like.

In addition, in the above embodiment, the hydraulic frictional engagement devices, such as the first clutch C1 and the second clutch C2, may be formed of magnetic powder type engagement devices, electromagnetic type engagement devices, or mechanical engagement type devices, such as a power (magnetic powder) clutch, an electromagnetic clutch and a constant mesh dog clutch. For example, when the hydraulic frictional engagement devices are electromagnetic type clutches, the hydraulic control circuit 70 is not formed of valve devices for switching an oil passage but formed of a switching device, an electromagnetic switching device, or the like, that switches an electrical instruction signal circuit to the electromagnetic clutches.

In addition, in the above embodiment, it is applicable that the automatic transmission unit 20 is coupled to the differential unit 11 in series via the power transmission member 18, a counter shaft is provided parallel to the input shaft 14, and the automatic transmission unit 20 is arranged concentrically on the counter shaft. In this case, the differential unit 11 and the automatic transmission unit 20 are coupled to each other so as to allow power to be transmitted via, for example, a set of transmission members such as a counter gear pair, a sprocket and a chain, as the power transmission member 18.

In addition, the power distribution mechanism 16, which serves as the differential mechanism according to the above embodiment, may be, for example, a differential gear unit in which a pinion driven for rotation by the engine and a pair of bevel gears in mesh with the pinion are operatively coupled to the first electric motor M1 and the power transmission member 18 (second electric motor M2).

In addition, the power distribution mechanism 16 according to the above described embodiment is formed of one planetary gear set. Instead, the power distribution mechanism 16 may be formed of two or more planetary gear sets, and may function as three or more speed-gear transmission in a non-differential state (stepped shift state). In addition, each planetary gear set is not limited to a single pinion type. Instead, each planetary gear set may be of a double pinion type. In addition; when the power distribution mechanism 16 is formed of such two or more planetary gear sets as well, it is also applicable that the engine 8, the first and second electric motors M1 and M2, and the power transmission member 18 are coupled to the rotating elements of these planetary gear sets so that power is transmittable, and the clutches C and brakes B connected to the rotating elements are controlled to switch between stepped shift and stepless shift.

In addition, in the above embodiment, the engine 8 and the differential unit 11 are directly coupled to each other; however, they are not necessarily directly coupled to each other. Instead, the engine 8 may be coupled to the differential unit 11 via a clutch.

In addition, in the above embodiment, the differential unit 11 is connected in series with the automatic transmission unit 20; however, the configuration is not specifically limited to it. Instead, the aspect of the invention is applicable as long as a configuration has the function of performing electrical differential by the transmission mechanism 10 as a whole and the function of shifting gears in the principles different from shifting by the electrical differential by the transmission mechanism 10 as a whole, and those functions are not necessarily mechanically independent of each other. In addition, arrangement positions and orders of the differential unit 11 and the automatic transmission unit 20 are also not specifically limited, and the differential unit 11 and the automatic transmission unit 20 may be freely arranged. In addition, the aspect of the invention may be applied to the transmission mechanism that has both the function of performing electrical differential and the function of shifting gears even when the transmission mechanism has partially overlapping or entirely overlapping configurations.

In addition, in the above embodiment, the four-speed transmission is used for the automatic transmission unit 20; however, the number of gears of the automatic transmission unit 20 is not limited to four. Instead, for example, the number of gears of the automatic transmission unit 20 may be freely modified to five, or the like. In addition, the relationship of coupling of the automatic transmission unit 20 is not specifically limited to the configuration described in the above embodiment. Instead, it may be freely modified.

Note that the above described embodiment is only illustrative; the aspect of the invention may be implemented in various forms with modifications or improvements on the basis of the knowledge of a person skilled in the art.

What is claimed is:
1. A controller for a vehicle power transmission system that transmits power of an engine to a drive wheel, comprising:
an electric differential unit that allows controlling a differential state between a rotational speed of an input shaft coupled to the engine and a rotational speed of an output shaft by controlling an operating state of an electric motor coupled to a rotating element of a differential mechanism;

a transmission unit that is arranged in a power transmission path between the electric differential unit and the drive wheel; and an engine upper limit setting device that, when the transmission unit is shifting speeds, and a rotational speed of the engine increases because of torque reduction control by the electric motor, prelimits an upper limit of the rotational speed of the engine to a value, at which the rotational speed of the engine is prevented from reaching a high rotational speed region during the torque reduction control, from a start of shifting through a start of the torque reduction control, wherein a determination as to whether the engine upper limit setting device switches the upper limit is made on a basis of a torque reduction amount required at a time when the transmission unit shifts speeds.

2. The controller for a vehicle power transmission system according to claim 1, wherein the engine upper limit setting device switches the upper limit of the rotational speed of the engine when a torque limitation of the engine is prohibited.

3. The controller for a vehicle power transmission system according to claim 1, wherein a determination as to whether the engine upper limit setting device switches the upper limit of the rotational speed of the engine is made on the basis of the rotational speed of the engine at the time when the transmission unit starts shifting speeds.

4. The controller for a vehicle power transmission system according to claim 1, wherein a determination as to whether the engine upper limit setting device switches the upper limit of the rotational speed of the engine is made on the basis of an input torque from the engine.

5. The controller for a vehicle power transmission system according to claim 1, wherein a determination as to whether the engine upper limit setting device switches the upper limit of the rotational speed of the engine is made on the basis of a vehicle speed.

6. The controller for a vehicle power transmission system according to claim 1, wherein a determination as to whether the engine upper limit setting device switches the upper limit of the rotational speed of the engine is made on the basis of a charge/discharge limit of an electrical storage device.

7. The controller for a vehicle power transmission system according to claim 1, wherein a determination as to whether the engine upper limit setting device switches the upper limit of the rotational speed of the engine is made on the basis of an accelerator operation amount.

8. The controller for a vehicle power transmission system according to claim 1, wherein a determination as to whether the engine upper limit setting device switches the upper limit of the rotational speed of the engine is made on the basis of a shift pattern of the transmission unit.

9. The controller for a vehicle power transmission system according to claim 1, wherein the upper limit of the rotational speed of the engine is switched on the basis of a torque reduction amount required at the time when the transmission unit shifts speeds.

10. The controller for a vehicle power transmission system according to claim 1, wherein the upper limit of the rotational speed of the engine is switched on the basis of an input torque from the engine.

11. The controller for a vehicle power transmission system according to claim 1, wherein the upper limit of the rotational speed of the engine is switched on the basis of a vehicle speed.

12. The controller for a vehicle power transmission system according to claim 1, wherein the upper limit of the rotational speed of the engine is switched on the basis of a charge/discharge limit of an electrical storage device.

13. The controller for a vehicle power transmission system according to claim 1, wherein the upper limit of the rotational speed of the engine is switched on the basis of an accelerator operation amount.

14. The controller for a vehicle power transmission system according to claim 1, wherein the upper limit of the rotational speed of the engine is switched on the basis of a shift pattern of the transmission unit.

15. The controller for a vehicle power transmission system according to claim 1, wherein the upper limit of the rotational speed of the engine is switched on the basis of an overrevolution determination rotational speed of the engine.

* * * * *